United States Patent
Okamoto et al.

(10) Patent No.: US 9,703,334 B2
(45) Date of Patent: Jul. 11, 2017

(54) STORAGE APPARATUS OF ELECTRONIC DEVICE

(71) Applicant: FUJITSU LIMITED, Kawasaki-shi, Kanagawa (JP)

(72) Inventors: Shinichirou Okamoto, Yokohama (JP); Shinichirou Kouno, Machida (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/084,569

(22) Filed: Mar. 30, 2016

(65) Prior Publication Data
US 2016/0291647 A1  Oct. 6, 2016

(30) Foreign Application Priority Data
Apr. 6, 2015 (JP) .................. 2015-077748

(51) Int. Cl.
G06F 1/16 (2006.01)
G06F 1/18 (2006.01)

(52) U.S. Cl.
CPC ............ *G06F 1/187* (2013.01); *G06F 1/1652* (2013.01)

(58) Field of Classification Search
CPC ...................................... G06F 1/187
USPC .... 361/679.31–679.39, 724–727; 312/223.1, 312/223.2
See application file for complete search history.

(56) References Cited

U.S. PATENT DOCUMENTS

| | | | | |
|---|---|---|---|---|
| 5,566,049 A | * | 10/1996 | Nguyen | G11B 33/128 248/221.11 |
| 9,351,421 B2 | * | 5/2016 | Lee | H05K 7/1487 |
| 2003/0147211 A1 | * | 8/2003 | Fairchild | G11B 33/1426 361/679.31 |
| 2005/0111136 A1 | | 5/2005 | Miyamoto et al. | |
| 2006/0250766 A1 | * | 11/2006 | Blaalid | G06F 1/187 361/679.33 |
| 2007/0025076 A1 | * | 2/2007 | Matsushima | G11B 33/142 361/679.33 |
| 2009/0002934 A1 | * | 1/2009 | Carlson | G06F 1/187 361/679.33 |
| 2014/0362515 A1 | * | 12/2014 | Pronozuk | H05K 7/1488 361/679.31 |
| 2015/0366095 A1 | * | 12/2015 | Junkins | H05K 5/0256 361/679.31 |

FOREIGN PATENT DOCUMENTS

| | | |
|---|---|---|
| JP | 2005-149684 | 6/2005 |
| JP | 2014-086123 | 5/2014 |

* cited by examiner

*Primary Examiner* — Nidhi Thaker
(74) *Attorney, Agent, or Firm* — Fujitsu Patent Center

(57) ABSTRACT

A storage apparatus of an electronic device, the storage apparatus includes: a plurality of chassis each configured to store a plurality of electronic devices, at an interval in which at least one electronic device is capable of being disposed; and a fixing portion configured to fix the plurality of chassis, wherein at least one of the plurality of chassis is formed such that in the interval of the electronic devices stored in the at least one of the plurality of chassis, at least one of the electronic devices stored in another chassis among the plurality of chassis is disposed.

18 Claims, 24 Drawing Sheets

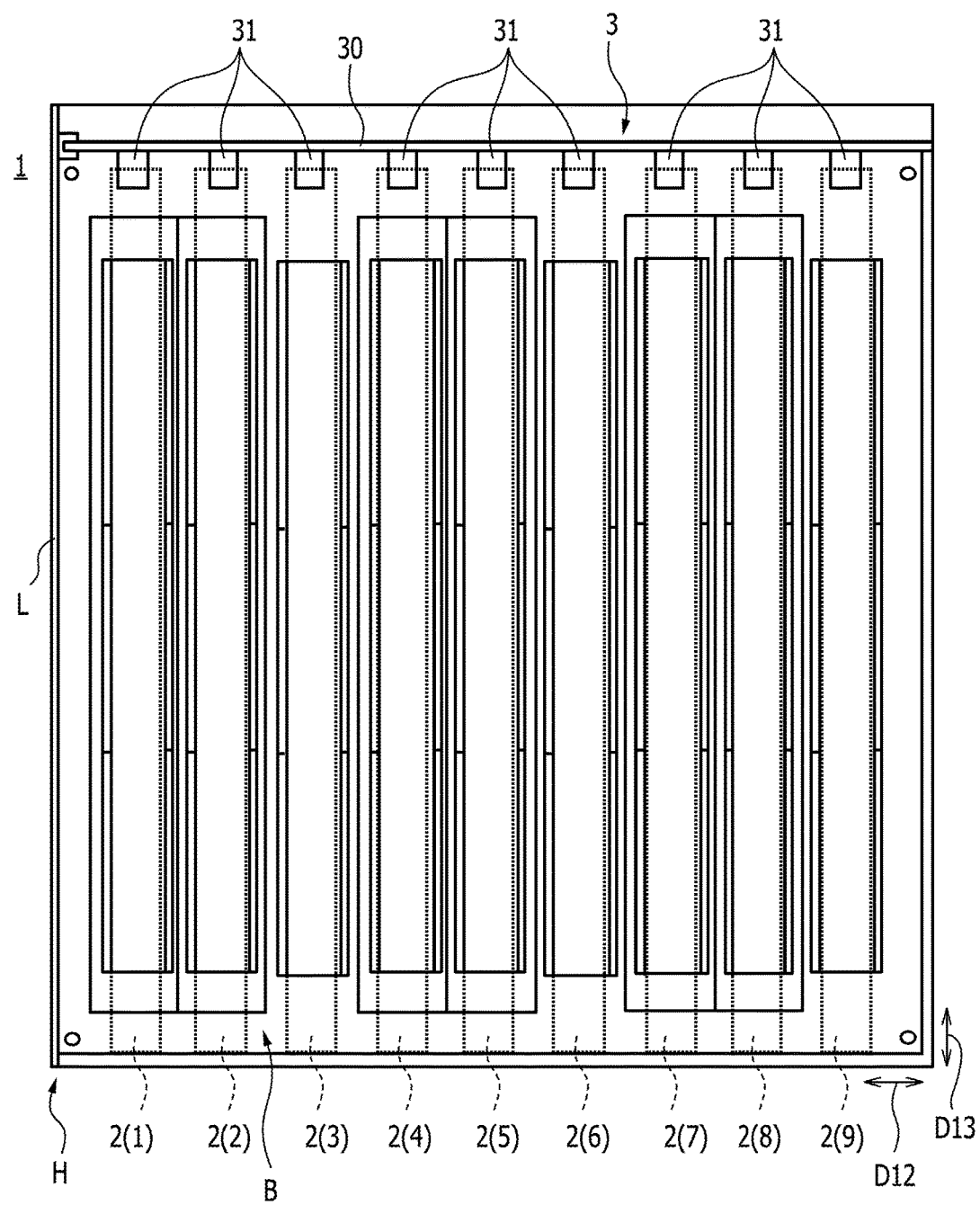

STORAGE APPARATUS OF ELECTRONIC DEVICE

CROSS-REFERENCE TO RELATED APPLICATIONS

This application is based upon and claims the benefit of priority from the prior Japanese Patent Application No. 2015-077748 filed on Apr. 6, 2015, the entire contents of which are incorporated herein by reference.

FIELD

The embodiments discussed herein are related to a storage apparatus of an electronic device.

BACKGROUND

A storage apparatus mounted with a plurality of storage units has been widely distributed. Such a storage apparatus is, for example, referred to as a disk array device. In many cases, a plurality of hard disk drive units (hereinafter, referred to as "HDD units") are mounted in the disk array device.

Related techniques are disclosed in, for example, Japanese Laid-Open Patent Publication No. 2005-149684, and Japanese Laid-Open Patent Publication No. 2014-086123.

SUMMARY

According to an aspect of an embodiment, a storage apparatus of an electronic device, the storage apparatus includes: a plurality of chassis each configured to store a plurality of electronic devices, at an interval in which at least one electronic device is capable of being disposed; and a fixing portion configured to fix the plurality of chassis, wherein at least one of the plurality of chassis is formed such that in the interval of the electronic devices stored in the at least one of the plurality of chassis, at least one of the electronic devices stored in another chassis among the plurality of chassis is disposed.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2B is a top view illustrating the storage apparatus of the first embodiment;

DESCRIPTION OF EMBODIMENTS

Figure 1:
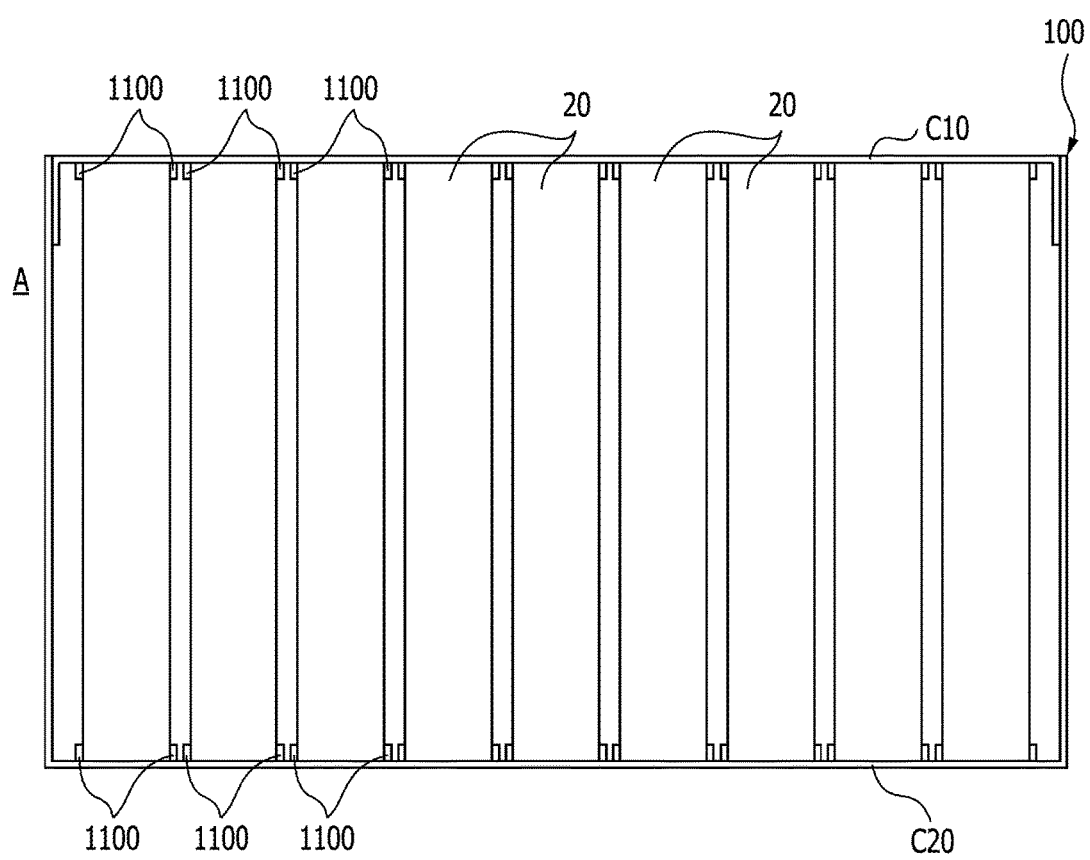
FIG. 1 is a front view illustrating a disk array device.

FIG. 1 is a front view illustrating a disk array device. The disk array device A includes a box-shaped storage apparatus 100 including an upper chassis C10 and a lower chassis C20, and a plurality of HDD units 20 (e.g., twenty (20) or more HDD units) arranged inside the storage apparatus 100. Meanwhile, for the simplicity of description, it is assumed that the disk array device A in FIG. 1 includes nine (9) HDD units 20.

In the disk array device A of FIG. 1, the upper end and the lower end of each HDD unit 20 are sandwiched between storage structures 1100 that protrude from the inner surfaces of the upper chassis C10 and the lower chassis C20, respectively. In the disk array device A having the above structure, vibration generated during the operation of one HDD unit 20 is transferred to other HDD units 20 via the upper chassis C10 and the lower chassis C20. The vibration transferred in this manner may cause deterioration in performance of the HDD units 20. In particular, a vibration transmission rate between two HDD units 20 increases as the two HDD units 20 come close to each other. Thus, it is considered that the performance deterioration becomes particularly remarkable between adjacent HDD units 20.

For example, there has been proposed providing a gap for ventilation between disk modules adjacent in the horizontal direction in a disk array device accommodating a plurality of disk modules in multi-stages. This may reduce the vibration transmission rate between the disk modules adjacent in the horizontal direction. However, even if the above technology is employed, the vibration transmission rate between adjacent disk drives within an individual disk module may not be reduced. In the related art, it has been proposed providing a resinous vibration absorbing member between a disk device and a fixing member configured to fix the disk device on a substrate in a storage apparatus accommodating a plurality of disk devices. This may reduce the vibration transmission rate between the disk device and the substrate. However, even if the above-described technology is employed, since the plurality of disk devices are still supported by the common substrate, the vibration transmission rate between the disk devices via the substrate may not be reduce Hereinafter, an embodiment of a storage apparatus according to the present application will be described in detail based on specific examples with reference to the accompanying drawings. In the embodiment described below, an HDD unit is exemplified as an electronic device stored in the storage apparatus. For example, the storage apparatus of the embodiment below forms one disk array device by storing a plurality of HDD units. However, an electronic device stored in the storage apparatus 1 may be another electronic device that generates vibration during operation, for example, an optical disk drive unit.

Figure 2A:
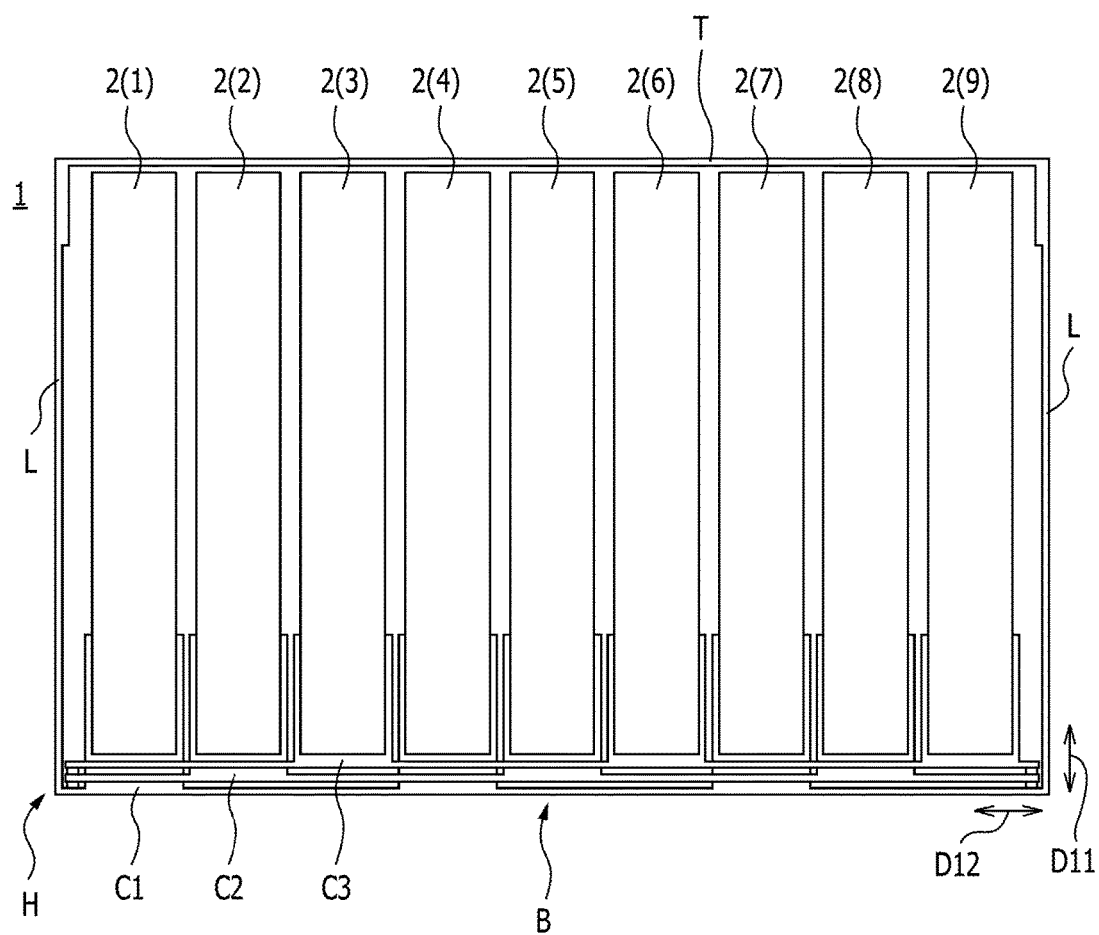
FIG. 2A is a front view illustrating a storage apparatus of a first embodiment.

First, descriptions will be made on the storage apparatus 1 of a first embodiment of the present application. FIG. 2A is a front view illustrating the storage apparatus 1 of the first embodiment. As in FIG. 2A, the storage apparatus 1 includes a bottom wall B and a top wall T which are parallel to each other, and a pair of side walls L which are perpendicular to the bottom wall B and the top wall T. The bottom wall B includes a plurality of chassis C1 to C3 which are fixed to each other. Then, the storage apparatus 1 stores a plurality of HDD units 2 within a space surrounded by the bottom wall B, the top wall T, and the pair of side walls L. For example, the bottom wall B, the top wall T, and the pair of side walls L form a chassis assembly H that stores the plurality of HDD units 2 therein. In the following description, the direction in which the bottom wall B and the top wall T are aligned will be referred to as a vertical direction of the storage apparatus 1, and the direction in which the pair of side walls L are aligned will be referred to as a horizontal direction of the storage apparatus 1. A direction perpendicular to both the vertical direction and the horizontal direction of the storage apparatus 1 is referred to as a longitudinal direction of the storage apparatus 1. In FIG. 2A, the vertical direction and the horizontal direction of the storage apparatus 1 are indicated by arrows D11 and D12, respectively (the same applies to other drawings).

As in FIG. 2A, each of the above-described plurality of chassis C1 to C3 stores a plurality of HDD units 2 to be spaced apart from each other in the horizontal direction. For example, the bottom wall B of the storage apparatus 1 is provided with three chassis C1 to C3 which are disposed to overlap each other in the vertical direction. Each of the chassis C1 to C3 stores three HDD units 2 at equal intervals. For example, the storage apparatus 1 stores nine HDD units 2 in total. Meanwhile, each of the chassis C1 to C3 is assumed to store three HDD units 2 in order to simplify the description, but may be formed to store more HDD units 2 without being limited to the three HDD units 2. This also applies to the second and third embodiments to be described later. The detailed structure of the three chassis C1 to C3 will be described below with reference to, for example, FIG. 2D, and FIGS. 3A to 3C. Reference numerals corresponding to horizontal positions are assigned to the respective HDD units 2 in FIG. 2A. For example, reference numeral 2(1) is assigned to the leftmost HDD unit in FIG. 2A, and reference numeral 2(9) is assigned to the rightmost HDD unit (i.e., the ninth left HDD unit). Similar reference numerals are also assigned to the HDD units 2 located therebetween. However, in the present specification, reference numeral 2 may be used in order to collectively refer to the HDD units 2(1) to 2(9).

Figure 2C:
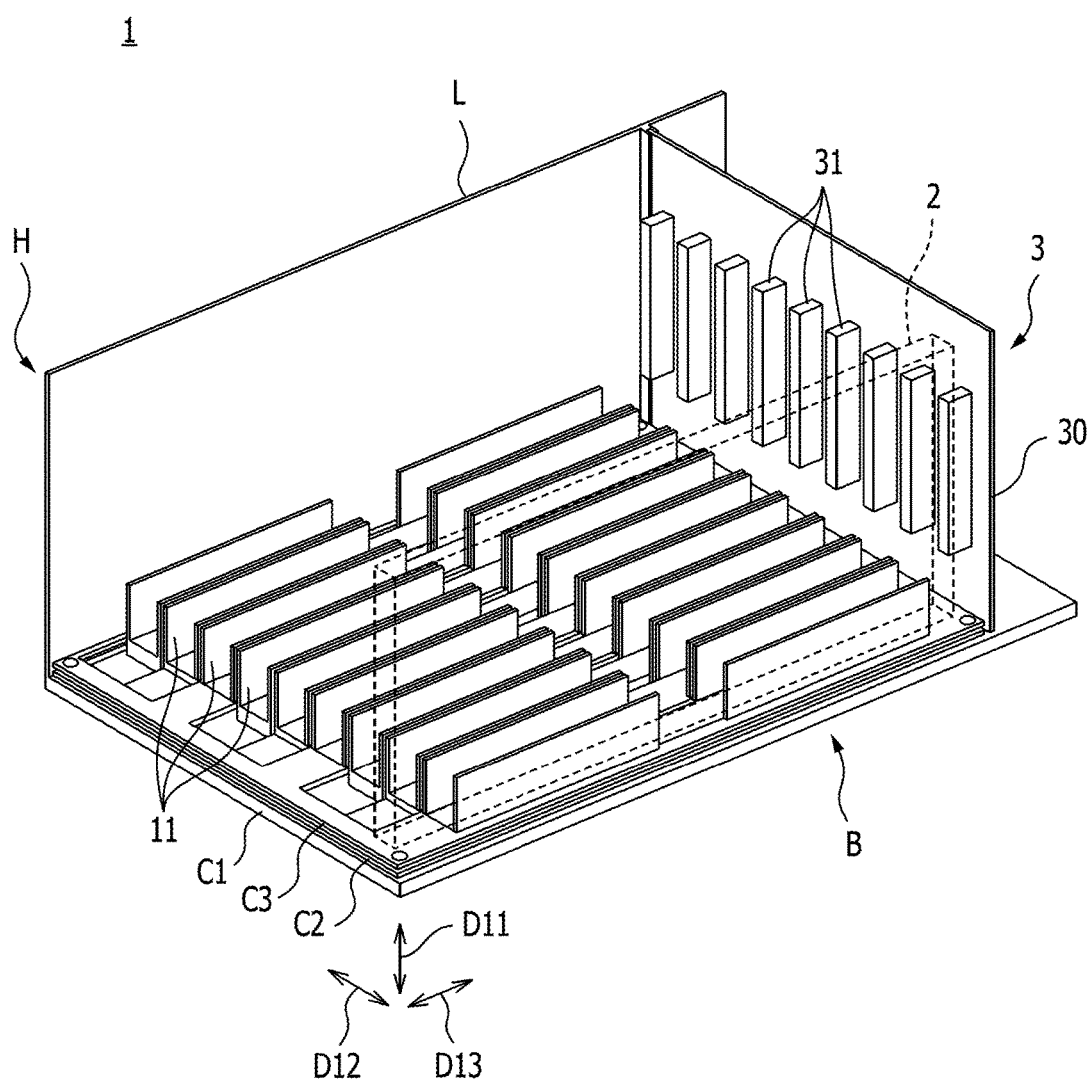
FIG. 2C is a perspective view illustrating the storage apparatus of the first embodiment.

FIG. 2B is a top view illustrating the storage apparatus 1 of the first embodiment. FIG. 2C is a perspective view illustrating the storage apparatus 1 of the first embodiment. In FIGS. 2B and 2C, the top wall T and one side wall L in FIG. 2A are omitted. In FIGS. 2B and 2C, the longitudinal direction of the storage apparatus 1 is indicated by an arrow D13 (the same applies to other drawings). As in FIG. 2C, each HDD unit 2 has an outer shape of a rectangular parallelepiped. In the present specification, a largest surface of the rectangular parallelepiped is referred to as a main surface. As in FIGS. 2B and 2C, the storage apparatus 1 includes a connector board 3 which is provided within the chassis assembly H to face the plurality of HDD units 2. The connector board 3 includes a substrate 30 provided to be perpendicular to both the bottom wall B and the side wall L, and a plurality of connectors 31 mounted on the substrate 30. Edge portions of the substrate 30 in the horizontal direction are fixed with respect to the side walls L. The plurality of connectors 31 are disposed to be spaced apart from each other in the horizontal direction to be coupled to the plurality of HDD units 2, respectively.

Figure 2D:
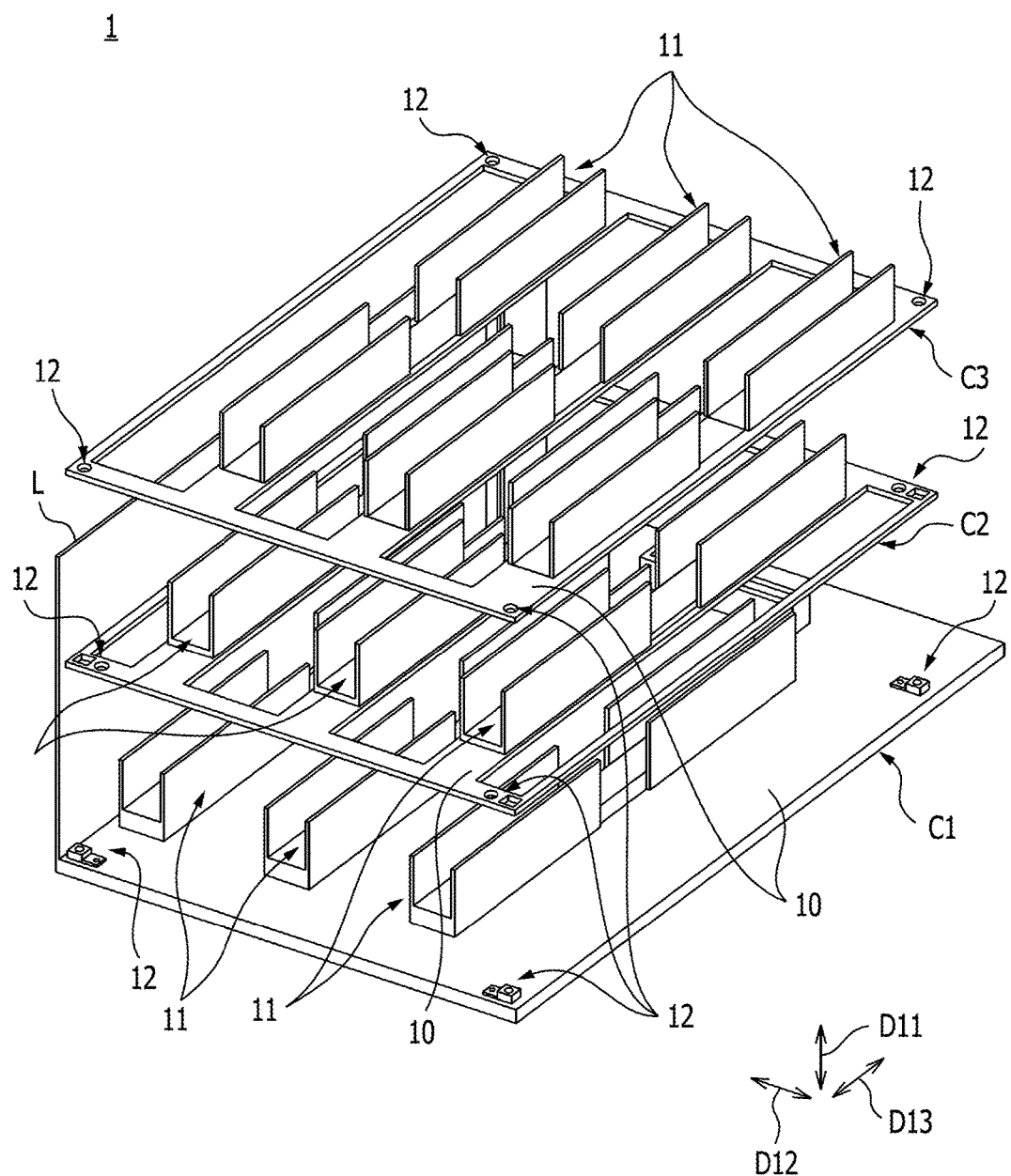
FIG. 2D is an exploded perspective view corresponding to FIG. 2C.

FIG. 2D is an exploded perspective view corresponding to FIG. 2C. In FIG. 2D, the connector board 3 in FIG. 2C is omitted. As in FIG. 2D, each of the three chassis C1 to C3 includes a body portion 10 having a flat plate shape, a plurality of storing portions 11 configured to store the HDD units 2 at the upper sides thereof, and a plurality of fixing portions 12 configured to fix the body portion 10 to another chassis C. In the following description, the chassis C1 located at the lowermost layer among the three chassis C1 to C3 is referred to as a first chassis C1. Similarly, the chassis C2 located at the upper layer of the first chassis C1 is referred to as a second chassis C2, and the chassis C3 located at the upper layer of the second chassis C2 is referred to as a third chassis C3. In the present specification, reference numeral C may be used in order to collectively refer to the three chassis C1 to C3.

As in FIG. 2D, each chassis C includes three storing portions 11 that are arranged to be spaced apart from each other in the horizontal direction. For example, the storage apparatus 1 includes nine storing portions 11 in total. The storing portions 11 of the first to third chassis C1 to C3 have a common structure and a common dimension. As in FIG. 2D, each storing portion 11 is divided into two parts in the longitudinal direction. Meanwhile, each storing portion 11 may be divided into three or more parts in the longitudinal direction, or may be formed from a single piece extending in the longitudinal direction. A more detailed structure of each storing portion 11 will be described with reference to, for example, FIGS. 3A to 3C. Each chassis C includes four fixing portions 12 disposed in proximity to four corners of the body portion 10. The four fixing portions 12 of each chassis have a common structure, and thus only one fixing portion 12 of each chassis C will be described below.

Figure 2E:
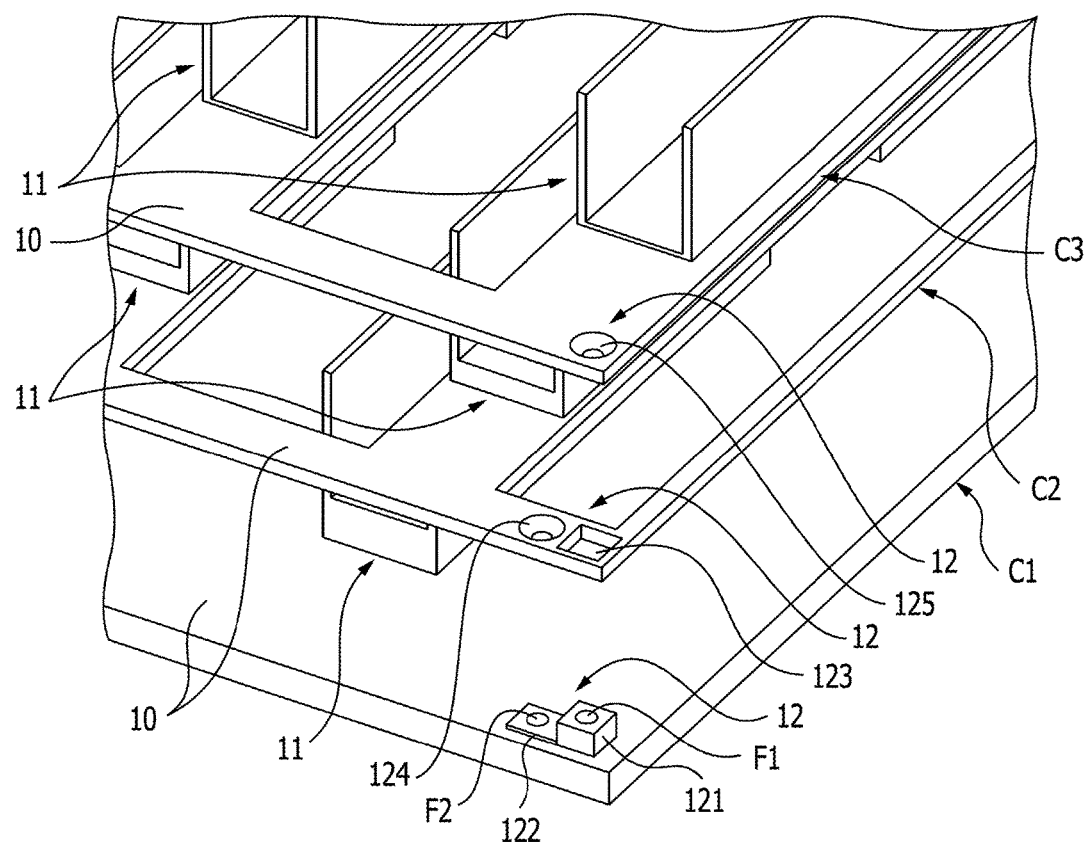
FIG. 2E is a view illustrating a part of a fixing portion of each chassis in FIG. 2D, in an enlarged scale.

FIG. 2E is a partial enlarged view of FIG. 2D, and illustrates one fixing portion 12 of each chassis C in FIG. 2D in an enlarged scale. As in FIG. 2E, the fixing portion 12 of the first chassis C1 includes a columnar first protrusion 121 provided on the top surface of the body portion 10, and a first female screw F1 provided on the top surface of the first protrusion 121. The fixing portion 12 of the first chassis C1 includes a second protrusion 122 provided on the top surface of the body portion 10 to be adjacent to the first protrusion 121, and a second female screw F2 provided on the top surface of the second protrusion 122. The height of the second protrusion 122 is smaller than the height of the first protrusion 121.

As in FIG. 2E, the fixing portion 12 of the second chassis C2 includes a through hole-type engaging hole 123 provided on the body portion 10, and a through hole-type circular hole 124 provided on the body portion 10 to be adjacent to the engaging hole 123. The engaging hole 123 of the second chassis C2 has a dimension and a shape corresponding to the first protrusion 121. When the second chassis C2 is fixed to the first chassis C1, the first protrusion 121 is fitted in the engaging hole 123, and the top surface of the second protrusion 122 is brought into contact with the bottom surface of the second chassis C2. Accordingly, the first chassis C1 and the second chassis C2 are disposed to be spaced apart from each other in the vertical direction at the same distance as the height of the second protrusion 122. After the second chassis C2 is fixed to the first chassis C1, the first female screw F1 remains exposed upward. In the circular hole 124 of the second chassis C2, a fixing member such as, for example, a screw or a bolt (not illustrated in FIG. 2E), is inserted from the upper side to fix the second chassis C2 to the first chassis C1. The fixing member inserted into the circular hole 124 is screwed to the second female screw F2.

Figure 2F:
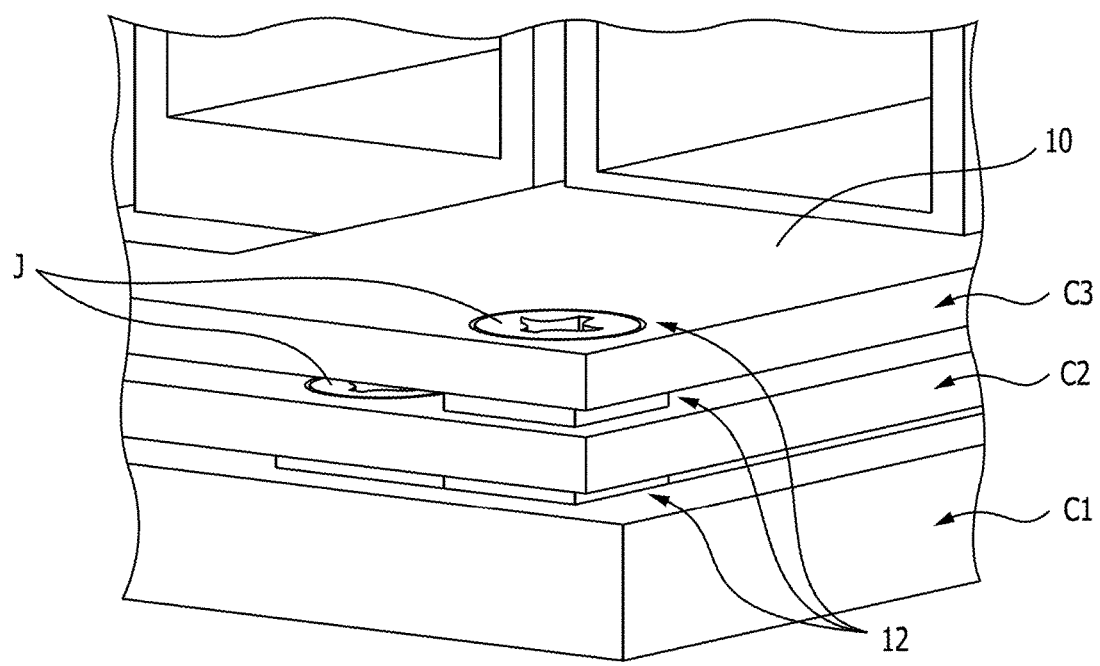
FIG. 2F is a view illustrating a part of a fixing portion of each chassis in FIG. 2C, in an enlarged scale.

As in FIG. 2E, the fixing portion 12 of the third chassis C3 includes a through hole-type circular hole 125 provided on the body portion 10. When the third chassis C3 is fixed to the first chassis C1, the top surface of the first protrusion 121 is brought into contact with the bottom surface of the third chassis C3. Accordingly, the second chassis C2 and the third chassis C3 are disposed to be spaced apart from each other in the vertical direction at a certain distance. The certain distance is the same as the length obtained by subtracting the height of the second protrusion 122 and the vertical thickness of the second chassis C2 from the height of the first protrusion 121. In the circular hole 125 of the third chassis C3, a fixing member such as, for example, a screw or a bolt (not illustrated in FIG. 2E), is inserted from the upper side to fix the third chassis C3 to the first chassis C1. The fixing member inserted into the circular hole 125 is screwed to the first female screw F1 of the first chassis C1. FIG. 2F is a partial enlarged view of FIG. 2C, and illustrates a state where the fixing portions 12 of the respective chassis C are fixed to each other by two fixing members J.

Figure 3A:
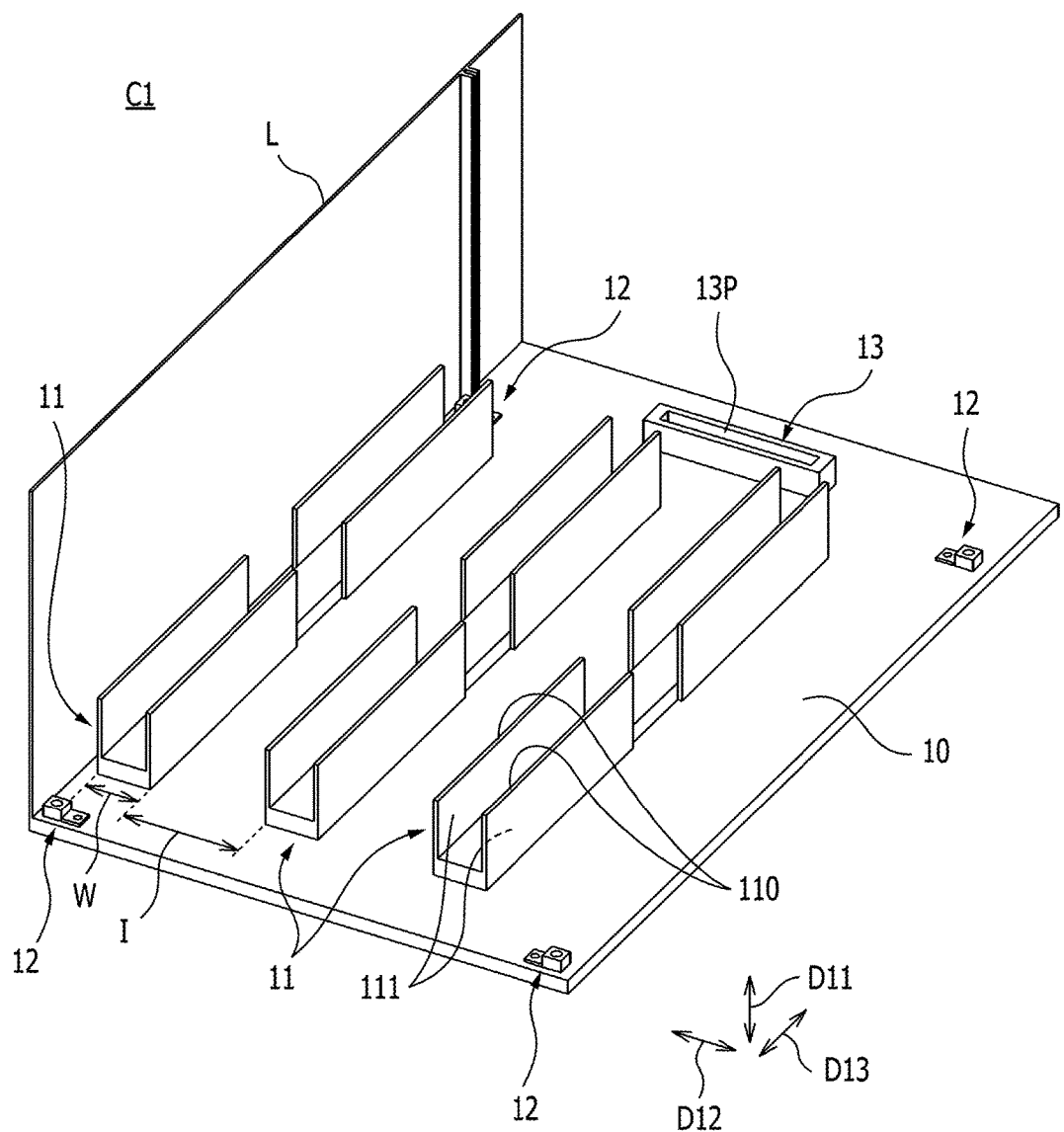
FIG. 3A is a perspective view illustrating a first chassis in the storage apparatus of the first embodiment.

Subsequently, a more detailed structure of each chassis C will be described. FIG. 3A is a perspective view illustrating the first chassis C1 in the storage apparatus 1 of the first embodiment. As described above, the three storing portions 11 of the first chassis C1 are arranged at equal intervals in the horizontal direction. The interval I between the storing portions 11 of the first chassis C1 is larger than twice the length of the horizontal width W of each storing portion 11 (I>W×2). Accordingly, in the interval between the storing portions 11 of the first chassis C1, two storing portions 11 of other chassis C may be arranged side by side. The above-described side walls L are fixed to the edge portions of the body portion 10 of the first chassis C1 in the horizontal direction.

Here, the structure of the storing portion 11 of the first chassis C1 will be described. As in FIG. 3A, the storing portion 11 of the first chassis C1 includes a pair of storing structure portions 110 provided on the top surface of the body portion 10. The pair of storing structure portions 110 have a pair of clamping surfaces 111 formed to clamp a pair of main surfaces of the HDD unit 2. Specifically, the pair of storing structure portions 110 have a pair of flat plate shapes that are perpendicular to a horizontal direction, and store the HDD unit 2 while the pair of main surfaces of the HDD unit 2 are clamped between the facing surfaces of the pair of flat plate shapes (see, e.g., FIG. 2C). Accordingly, the HDD unit 2 is supported in a vertical posture relative to the body portion 10. The storing portions 11 of the second and third chassis C2 and C3 have substantially the same structure as that of the storing portion 11 of the first chassis C1 as described above.

As in FIG. 3A, the first chassis C1 includes a terminal block 13 provided on the top surface of the body portion 10, in addition to the body portion 10, the storing portions 11, and the fixing portions 12 as described above. The terminal block 13 of the first chassis C1, with the connector board 3 (omitted in FIG. 3A) being inserted therein, is located on the opposite side to the storing portions 11 (see, e.g., FIG. 2C). The terminal block 13 of the first chassis C1 is electrically coupled to a control unit (not illustrated) configured to control the operations of the plurality of HDD units 2. A terminal part (not illustrated) provided on the rear surface of the connector board 3 is inserted into a connection port 13P of the terminal block 13. Accordingly, the control unit and the connector board 3 are electrically coupled to each other.

Figure 3B:
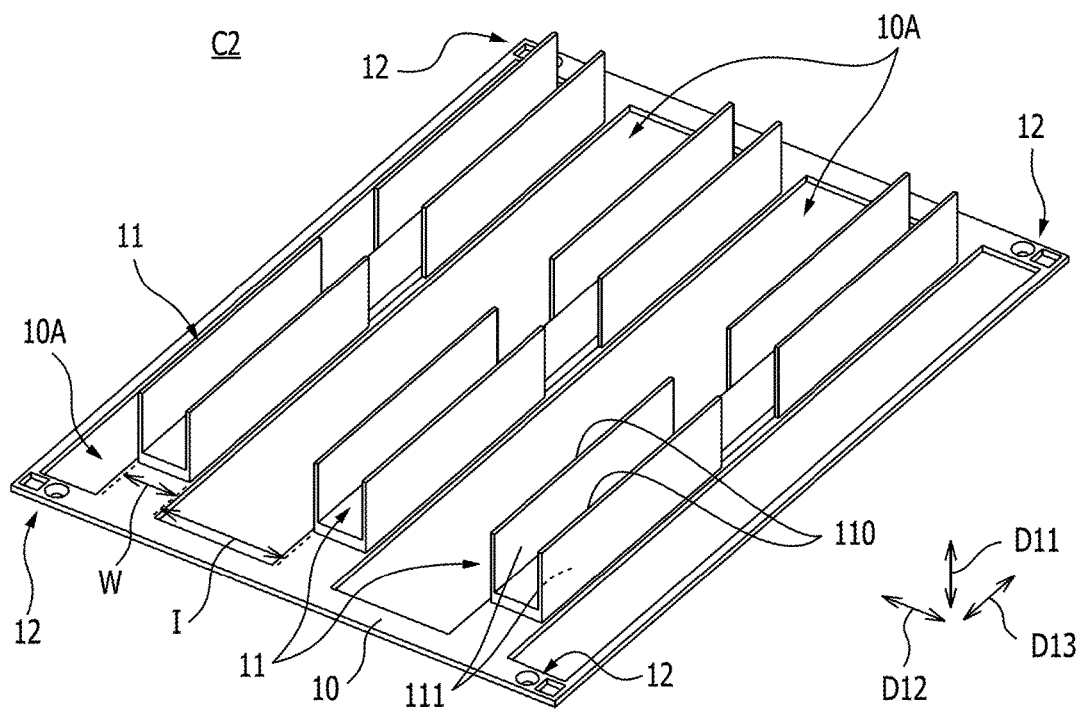
FIG. 3B is a perspective view illustrating a second chassis in the storage apparatus of the first embodiment.

FIG. 3B is a perspective view illustrating the second chassis C2 in the storage apparatus 1 of the first embodiment. As described above, the three storing portions 11 of the second chassis C2 are arranged at equal intervals in the horizontal direction. An interval I between the storing portions 11 of the second chassis C2 is larger than twice the length of the horizontal width W of each storing portion 11 (I>W×2). Accordingly, in the interval I between the storing portions 11 of the second chassis C2, two storing portions 11 of other chassis C may be arranged side by side.

As in FIG. 3B, the second chassis C2 includes a plurality of rectangular openings 10A provided on the body portion 10, in addition to the body portion 10, the storing portions 11, and the fixing portions 12 as described above. Each of the openings 10A is an example of a chassis opening. The plurality of openings 10A of the second chassis C2 are arranged alternately with the plurality of storing portions 11 in the horizontal direction. Particularly, the plurality of openings 10A of the second chassis C2 are formed to allow the plurality of storing portions 11 of the first chassis C1 to pass upward through the openings 10A when the second chassis C2 is fixed to the first chassis C1 through the above procedure. For example, even after the second chassis C2 is superimposed on the first chassis C1, the plurality of storing portions 11 of the first chassis C1 remain exposed upward (see, e.g., FIGS. 2C and 2D).

Specifically, the leftmost opening 10A of the second chassis C2 in FIG. 3B is formed to allow the leftmost storing portion 11 of the first chassis C1 in FIG. 3A to be exposed upward. Similarly, the second left opening 10A of the second chassis C2 in FIG. 3B is formed to allow the second left storing portion 11 of the first chassis C1 in FIG. 3A to be exposed upward. Similarly, the third left opening 10A of the second chassis C2 in FIG. 3B is formed to allow the third left storing portion 11 of the first chassis C1 in FIG. 3A to be exposed upward.

Figure 3C:
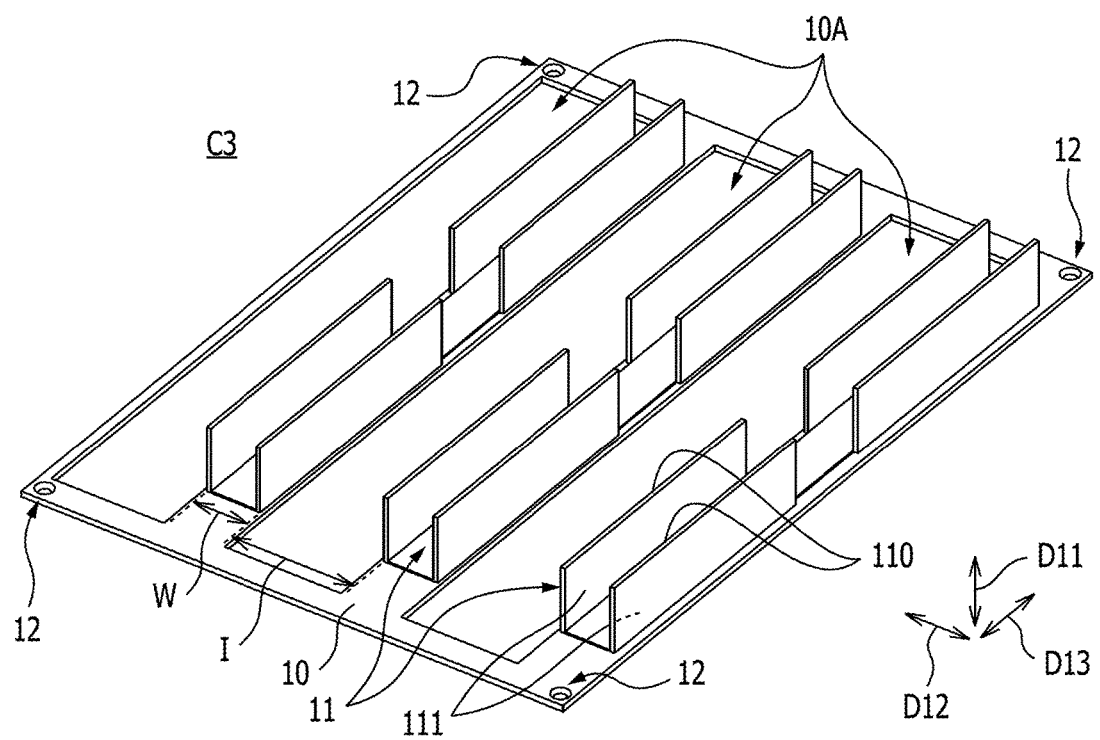
FIG. 3C is a perspective view illustrating a third chassis in the storage apparatus of the first embodiment.

FIG. 3C is a perspective view illustrating the third chassis C3 in the storage apparatus 1 of the first embodiment. As described above, the three storing portions 11 of the third chassis C3 are arranged at equal intervals in the horizontal direction. An interval I between the storing portions 11 of the third chassis C3 is larger than twice the length of the horizontal width W of each storing portion 11 (I>W×2). Accordingly, in the interval I between the storing portions 11 of the third chassis C3, two storing portions 11 of other chassis C may be arranged side by side.

As in FIG. 3C, the third chassis C3 includes a plurality of rectangular openings 10A provided on the body portion 10, in addition to the body portion 10, the storing portions 11, and the fixing portions 12 as described above. The plurality of openings 10A of the third chassis C3 are arranged alternately with the plurality of storing portions 11 in the horizontal direction. Particularly, the plurality of openings 10A of the third chassis C3 are formed to allow the plurality of storing portions 11 of the first and second chassis C1 and C2 to pass upward through the openings 10A when the third chassis C3 is fixed to the first chassis C1 through the above procedure. For example, even after the third chassis C3 is superimposed on the first and second chassis C1 and C2, the plurality of storing portions 11 of the first and second chassis C1 and C2 remain exposed upward (see, e.g., FIGS. 2C and 2D).

Specifically, the leftmost opening 10A of the third chassis C3 in FIG. 3C is formed to allow both the leftmost storing portion 11 of the first chassis C1 in FIG. 3A and the leftmost storing portion 11 of the second chassis C2 in FIG. 3B to be exposed upward. Similarly, the second left opening 10A of the third chassis C3 in FIG. 3C is formed to allow both the second left storing portion 11 of the first chassis C1 in FIG. 3A and the second left storing portion 11 of the second chassis C2 in FIG. 3B to be exposed upward. Similarly, the third left opening 10A of the third chassis C3 in FIG. 3C is formed to allow both the third left storing portion 11 of the first chassis C1 in FIG. 3A and the third left storing portion 11 of the second chassis C2 in FIG. 3B to be exposed upward.

As described above, in the storage apparatus 1 of the present embodiment, each of the chassis C other than the lowermost chassis C1 includes openings 10A that allow storing portions 11 of the chassis C other than the uppermost chassis C3 to be exposed upward. Accordingly, even after the plurality of chassis C1 to C3 are vertically superimposed, all the plurality of storing portions 11 of the plurality of chassis C1 to C3 are exposed upward. Specifically, in FIG. 2C, all of the nine storing portions 11 of the three chassis C1 to C3 are exposed upward. This enables the nine HDD units 2 to be stored side by side in the horizontal direction, as in FIGS. 2A and 2B.

Reference will be made to FIG. 2A again. In the storage apparatus 1 of the present embodiment, since each chassis C has the structure described above, adjacent HDD units 2 are stored in separate chassis C, respectively. For example, the leftmost HDD unit 2(1) in FIG. 2A is stored in the first chassis C1, and the second left HDD unit 2(2) is stored in the second chassis C2. In addition, the third left HDD unit 2(3) in FIG. 2A is stored in the third chassis C3. Similarly, the fourth left to sixth left HDD units 2(4) to 2(6) in FIG. 2A are stored in the first to third chassis C1 to C3, respectively. Similarly, the seventh left to ninth left HDD units 2(7) to 2(9) in FIG. 2A are stored in the first to third chassis C1 to C3, respectively.

Figure 4:
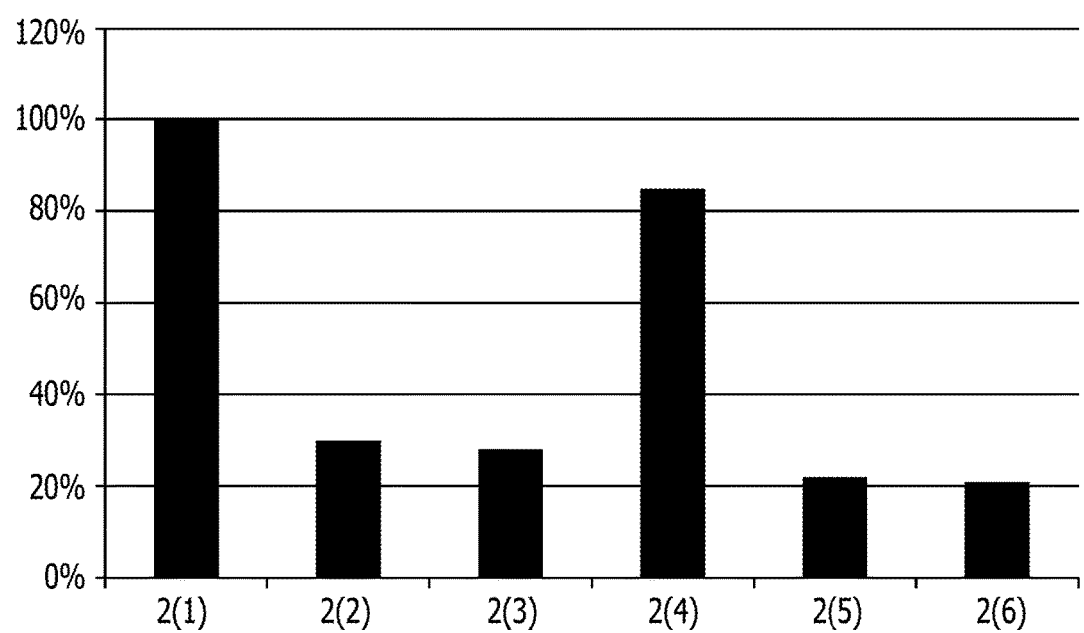
FIG. 4 is a bar graph representing a reduction effect of a vibration transmission rate which is achieved by the storage apparatus of the first embodiment.

Accordingly, according to the storage apparatus 1 of the present embodiment, since the vibrations of adjacent HDD units 2 are transferred to separate chassis C, a vibration transmission rate from one of the adjacent HDD units 2 to the other of the HDD unit 2s is capable of being reduced. Hereinafter, descriptions will be made on a reduction effect of the vibration transmission rate which is achieved by the storage apparatus 1 of the present embodiment. Table 1 below illustrates a rate of a vibration transferred to each of the other HDD units 2(2) to 2(6) when the vibration is generated during the operation of only the first left HDD unit 2(1) in FIG. 2A. The vibration transmission rate in Table 1 is calculated from, for example, a vibration measurement value (Grms value) of a first acceleration sensor attached to the first HDD unit 2(1), and a vibration measurement value (Grms value) of a second acceleration sensor attached to each of the other HDD units 2(2) to 2(6). FIG. 4 is a bar graph representing the vibration transmission rate in Table 1.

TABLE 1

| HDD unit | (1) | (2) | (3) | (4) | (5) | (6) |
|---|---|---|---|---|---|---|
| Vibration transmission rate | 100% | 30% | 28% | 86% | 24% | 22% |

Figure 5:
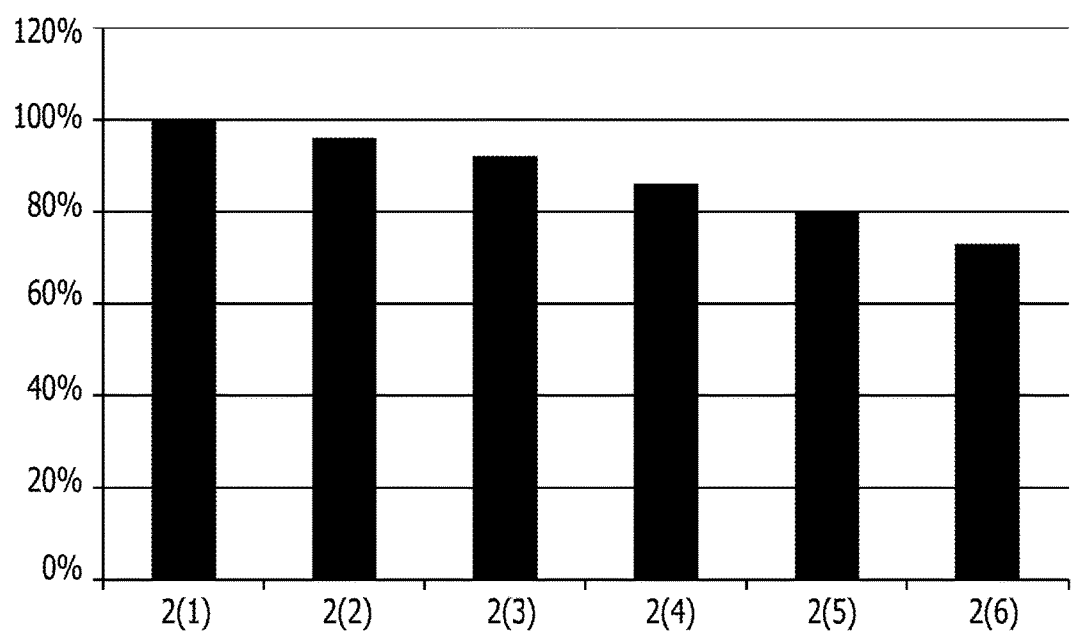
FIG. 5 is a bar graph representing a measurement result of a vibration transmission rate between HDD units in the storage apparatus in FIG. 1.

As a comparative example of Table 1, a measurement result of a vibration transmission rate between the HDD units 20 of the storage apparatus 100 in FIG. 1 is noted. Table 2 below illustrates a rate of a vibration transferred to each of the other HDD units 20 when the vibration is generated during operation of only the first left HDD unit 20 in FIG. 1. In the following description, reference numeral 20(1) is assigned to the first left HDD unit 20 in FIG. 1, and reference numeral 20(6) is assigned to the sixth left HDD unit 20. Similar reference numerals are also assigned to the HDD units 20 located therebetween. The vibration transmission rate in Table 2 is calculated from, for example, a vibration measurement value of a first acceleration sensor attached to the first HDD unit 20(1), and a vibration measurement value of a second acceleration sensor attached to each of the other HDD units 20(2) to 20(6). FIG. 5 is a bar graph representing the vibration transmission rate in Table 2.

TABLE 2

| HDD unit | (1) | (2) | (3) | (4) | (5) | (6) |
|---|---|---|---|---|---|---|
| Vibration transmission rate | 100% | 96% | 92% | 86% | 80% | 73% |

As can be seen from FIG. 5, in the storage apparatus 100 in FIG. 1, since the vibration of one HDD unit 20 is transferred to its adjacent HDD unit 20 via the common chassis C10 and C20, the vibration transmission rate between the adjacent HDD units 20 is very large. Specifically, in the storage apparatus 100 in FIG. 1, 96% of vibration of the first left HDD unit 20(1) is transferred to its adjacent HDD unit 20(2). Meanwhile, in the storage apparatus 1 of the present embodiment, the vibration of one HDD unit 2 is not transferred to its adjacent HDD unit 2 via a common chassis. Thus, the vibration transmission rate between the adjacent HDD units 2 is largely reduced as in FIG. 4.

Specifically, in the storage apparatus 1 of the present embodiment, merely 30% of the vibration of the first left HDD unit 2(1) is transferred to its adjacent HDD unit 2(2). The reason why the vibration transmission rate is reduced as described above is because the first left HDD unit 2(1) and the second HDD unit 2(2) are stored in separate chassis C, respectively. As described above, the first left HDD unit 2(1) is stored in the first chassis C1, and the second left HDD unit 2(2) is stored in the second chassis C2. In the storage apparatus 1 of the present embodiment, merely 28% of the vibration of the first left HDD unit 2(1) is transferred to the third HDD unit 2(3). The reason why the vibration transmission rate is reduced as described above is because the first left HDD unit 2(1) and the third HDD unit 2(3) are stored in separate chassis C, respectively. As described above, the first left HDD unit 2(1) is stored in the first chassis C1, and the third left HDD unit 2(3) is stored in the third chassis C3.

Figure 6:
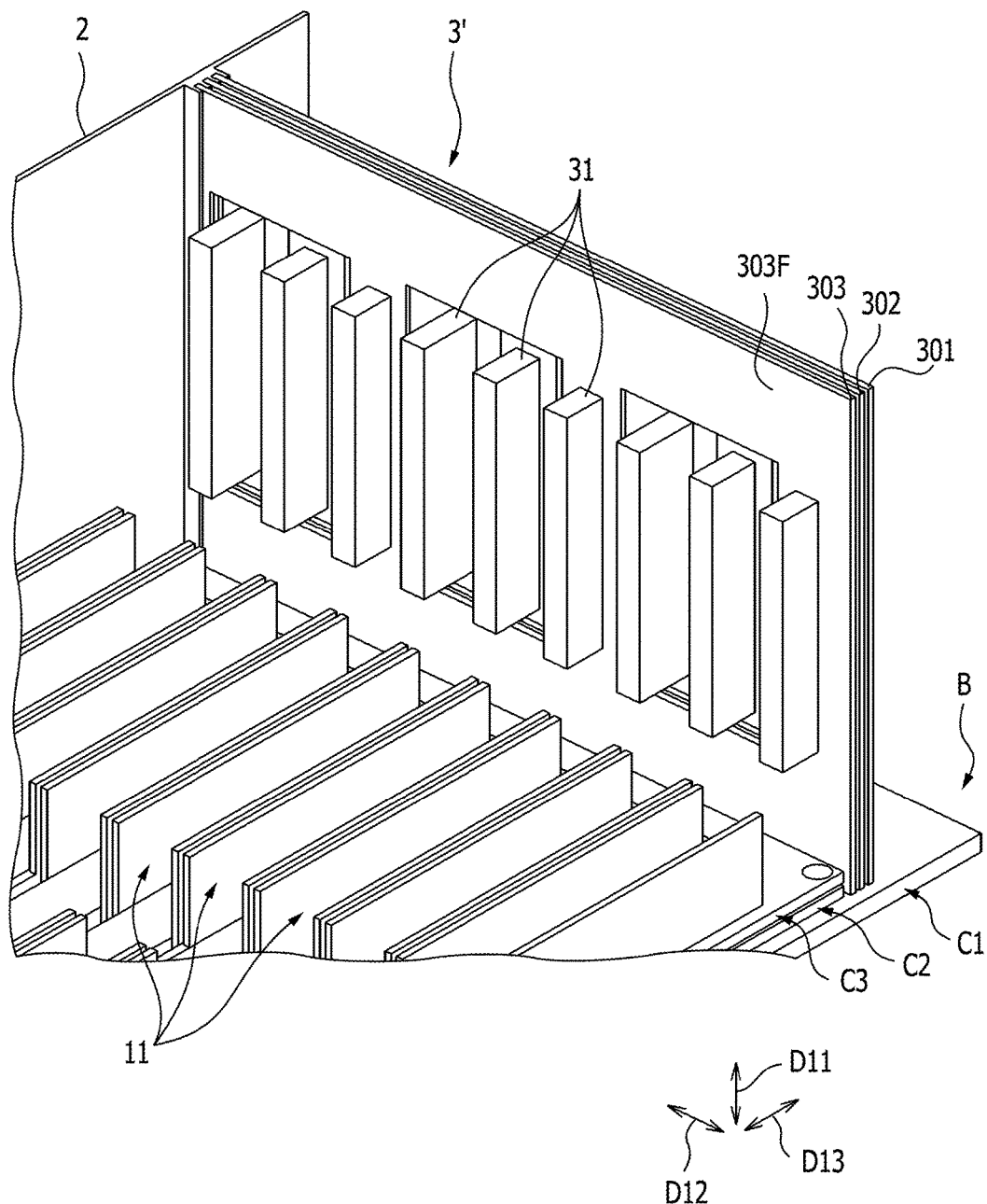
FIG. 6 is a perspective view illustrating a part of a storage apparatus to which a modified connector board is applied.

Subsequently, descriptions will be made on a modification of the connector board 3 in the storage apparatus 1 of the present embodiment. FIG. 6 is a perspective view illustrating a part of the storage apparatus 1 to which a connector board 3' of the present example is applied. As illustrated in FIG. 6, the connector board 3' of the present example includes a plurality of substrates 301 to 303 provided to be perpendicular to both the bottom wall B and the side wall L and a plurality of connectors 31 mounted on the plurality of substrates 301 to 303. In particular, unlike the connector board 3 described above, the connector board 3' of the present example includes three substrates 301 to 303 arranged to overlap in the longitudinal direction. Edge portions of the substrates 301 to 303 in the horizontal direction are fixed to the side walls L.

In the following description, among the three substrates 301 to 303 arranged to overlap in the longitudinal direction, the substrate farthest from the storing portions 11 will be referred to as a first substrate 301, and the substrate second farthest from the storing portions 11 will be referred to as a second substrate 302. The substrate nearest to the storing portions 11 will be referred to as a third substrate 303. Main surfaces of the first to third substrates 301 to 303 facing the storing portions 11 will be referred to as front surfaces 301F to 303F, respectively. In the connector board 3' of the present example, the electrical connections between the first to third substrates 301 to 303 are established by a flexible cable (not illustrated).

Figure 7:
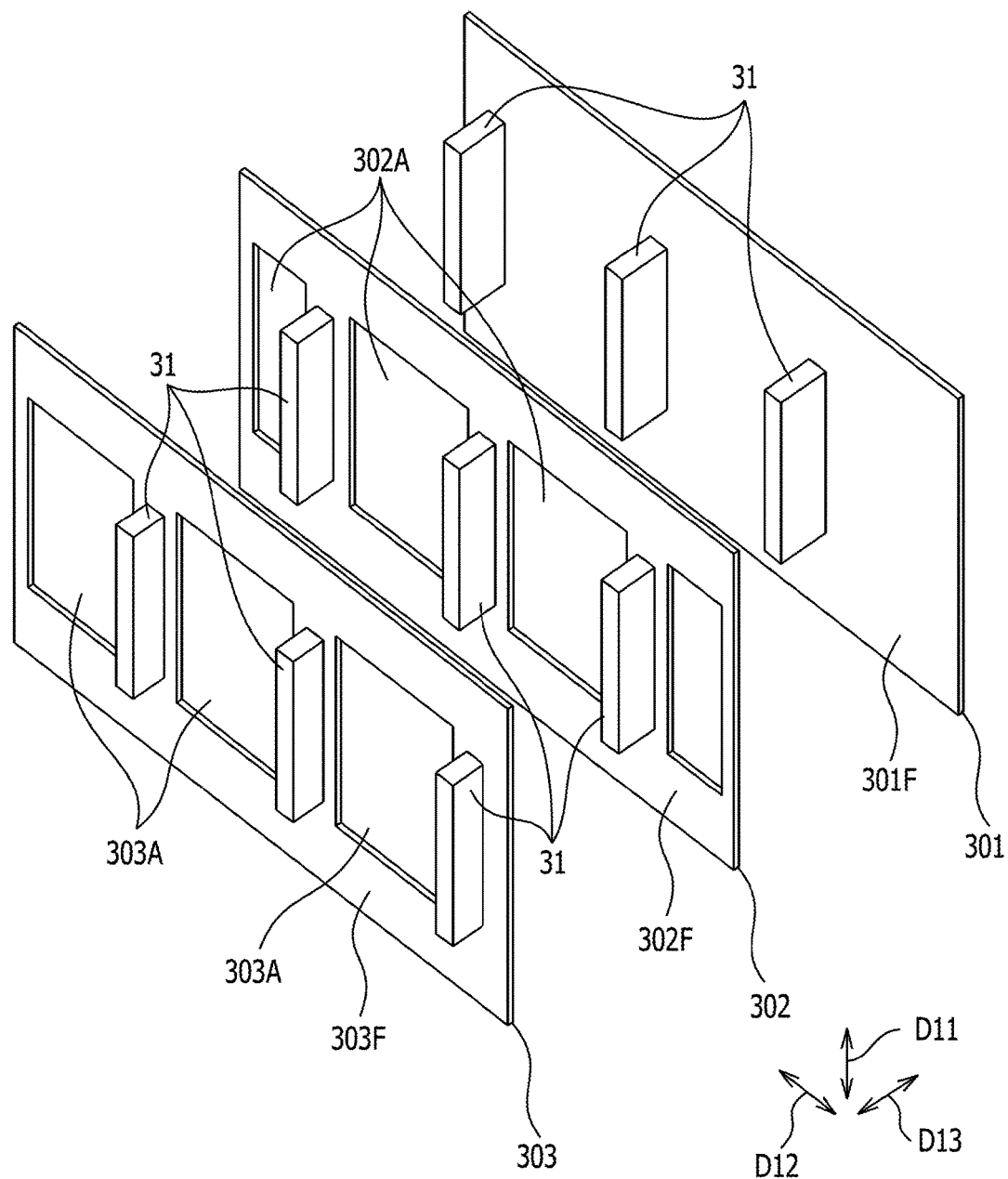
FIG. 7 is an exploded perspective view illustrating the connector board in FIG. 6.

FIG. 7 is an exploded perspective view illustrating the connector board 3' in FIG. 6. As in FIG. 7, the first substrate 301 includes a plurality of connectors 31 mounted on the front surface 301F. Specifically, the first substrate 301 includes three connectors 31 arranged at equal intervals in the horizontal direction. The three connectors 31 of the first substrate 301 are coupled to the three HDD units 2 stored in the first chassis C1, respectively. As in FIG. 7, the second substrate 302 includes a plurality of connectors 31 mounted on the front surface 302F, and a plurality of rectangular openings 302A arranged alternately with the connectors 31. Specifically, the second substrate 302 includes three connectors 31 arranged at equal intervals in the horizontal direction. Each connector 31 of the second substrate 302 is arranged to be shifted in a horizontal direction with respect to each connector 31 of the first substrate 301. The three connectors 31 of the second substrate 302 are coupled to the three HDD units 2 stored in the second chassis C2, respectively. The openings 302A of the second substrate 302 are provided at horizontal positions that correspond to the connectors 31 of the first substrate 301, respectively. Thus, even after the second substrate 302 is superimposed on the first substrate 301, the connectors 31 of the first substrate 301 are exposed through the openings 302A of the second substrate 302 in front of the second substrate 302.

Like the second substrate 302, the third substrate 303 includes a plurality of connectors 31 mounted on the front surface 303F, and a plurality of rectangular openings 303A arranged alternately with the connectors 31. Specifically, the third substrate 303 includes three connectors 31 arranged at equal intervals in the horizontal direction. Each connector 31 of the third substrate 303 is arranged to be shifted in a horizontal direction with respect to each connector 31 of the first and second substrates 301 and 302. The connectors 31 of the third substrate 303 are coupled to the HDD units 2 stored in the third chassis C3, respectively. The openings 303A of the third substrate 303 are provided at horizontal positions that correspond to the connectors 31 of the first and second substrates 301 and 302, respectively. Thus, even after the third substrate 303 is superimposed on the second substrate 302, the connectors 31 of the first and second substrates 301 and 302 are exposed through the openings 303A of the third substrate 303 in front of the third substrate 303. Each of the openings 302A and 303A of the second and third substrates 302 and 303 is an example of a substrate opening.

As described above, according to the connector board 3' of the present example, adjacent HDD units 2 are coupled to connectors 31 of separate substrates, respectively. For example, according to the connector board 3' of the present example, vibration of one HDD unit 2 is not transferred to its adjacent HDD unit 2 via a common substrate. Therefore, the vibration transmission rate between the adjacent HDD units 2 may be further reduced. According to the connector board 3' of the present example, the HDD units 2 stored in the same chassis C are coupled to the connectors 31 of the same substrate, respectively. Specifically, all the three HDD units 2 stored in the first chassis C1 are connected to the connectors 31 of the first substrate 301, respectively. Similarly, all the three HDD units 2 stored in the second chassis C2 are coupled to the connectors 31 of the second substrate 302, respectively. Similarly, all the three HDD units 2 stored in the third chassis C3 are coupled to the connectors 31 of the third substrate 303, respectively. This may prevent the vibration of each chassis C from being transferred to another chassis C through the substrates.

Figure 8A:
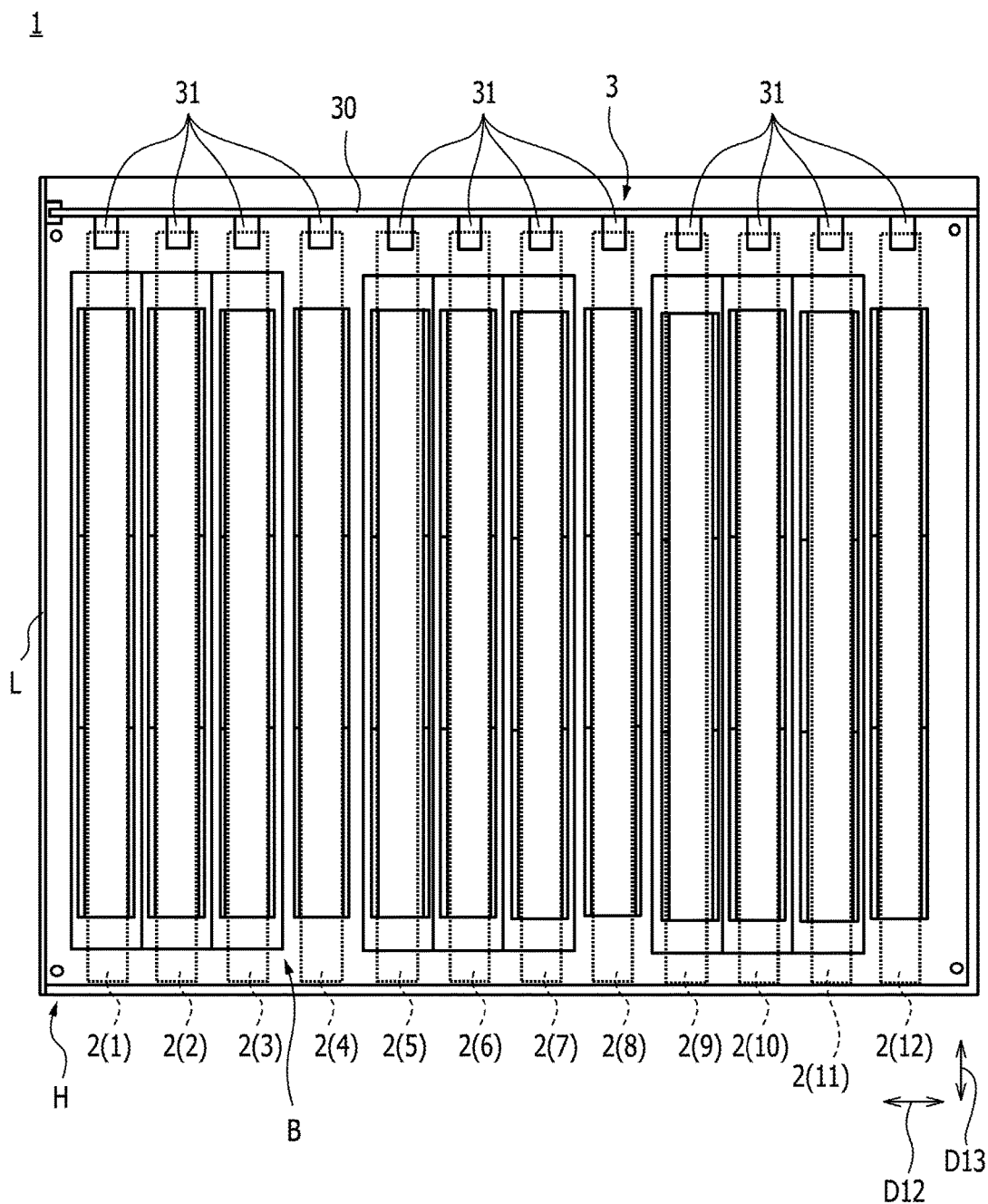
FIG. 8A is a top view of a storage apparatus of a second embodiment.
Figure 8B:
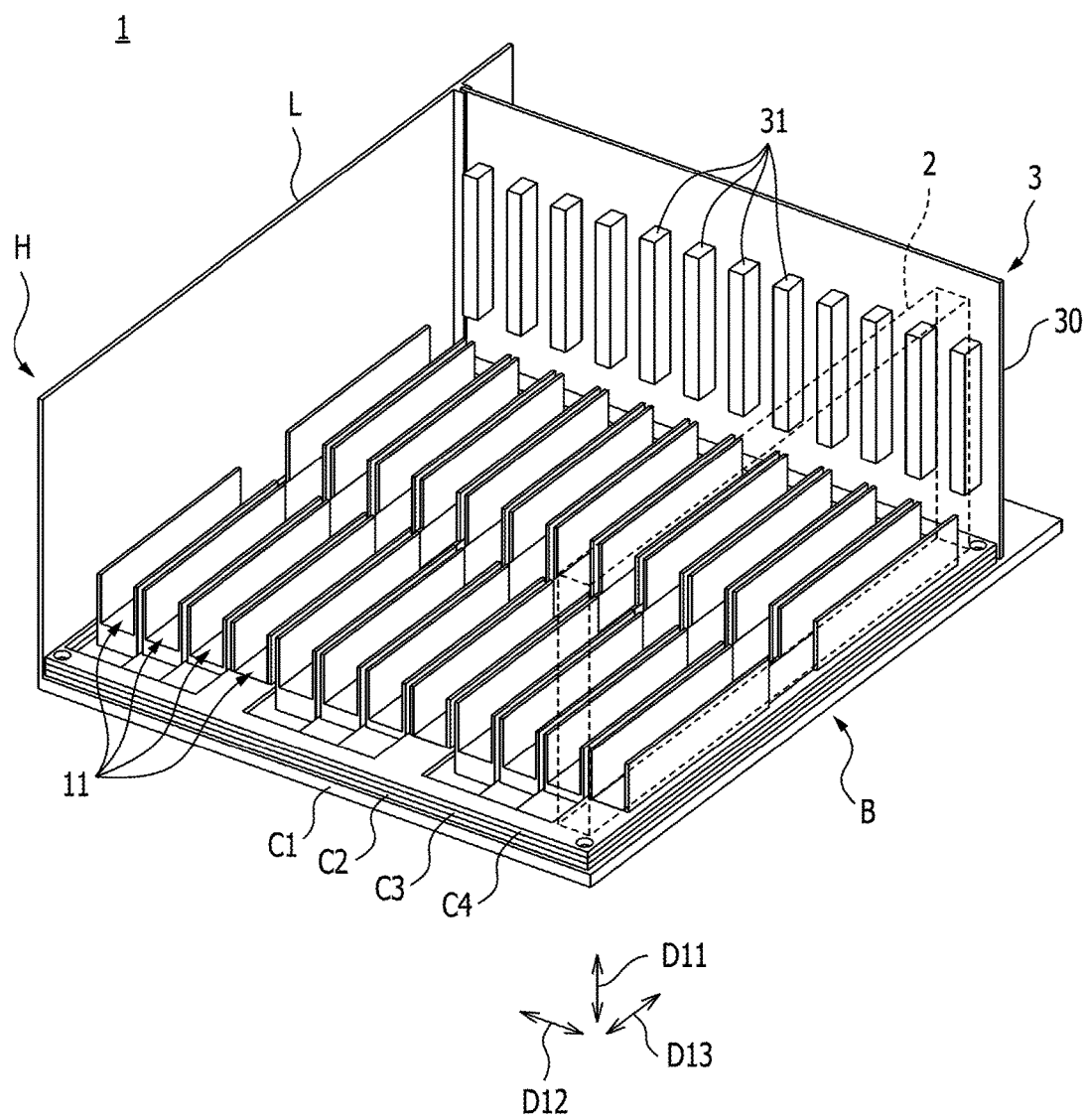
FIG. 8B is a perspective view of the storage apparatus of the second embodiment.

Hereinafter, descriptions will be made on the storage apparatus 1 of the second embodiment of the present application with reference to FIGS. 8A to 8C and FIG. 9. FIG. 8A is a top view illustrating the storage apparatus 1 of the second embodiment, which is similar to FIG. 2B. FIG. 8B is a perspective view illustrating the storage apparatus 1 of the second embodiment, which is similar to FIG. 2C. As in FIGS. 8A and 8B, the storage apparatus 1 of the second embodiment includes a chassis assembly H configured to store a plurality of HDD units 2, and a connector board 3 provided within the chassis assembly H to face the plurality of HDD units 2. Similarly to the first embodiment, the chassis assembly H includes a bottom wall B, a pair of side walls L, and a top wall T (omitted in FIGS. 8A and 8B). The connector board 3 includes a substrate 30 provided to be perpendicular to both the bottom wall B and the side wall L and a plurality of connectors 31 mounted on the substrate 30. Meanwhile, the storage apparatus 1 of the second embodiment may include the connector board 3' illustrated in FIGS. 6 and 7.

Figure 8C:
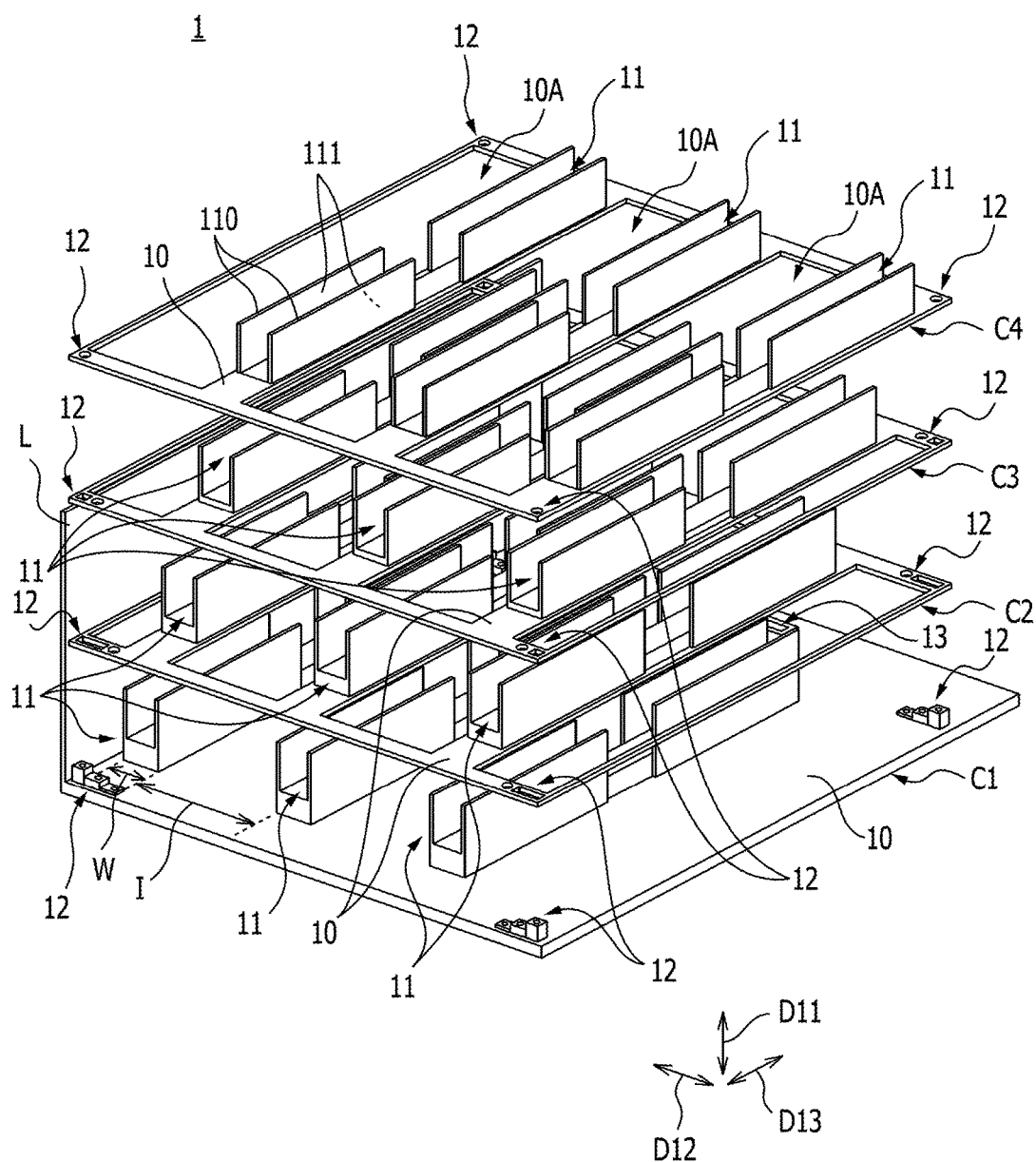
FIG. 8C is an exploded perspective view corresponding to FIG. 8B.

As can be found from comparison of FIG. 8B to FIG. 2C, in the storage apparatus 1 of the second embodiment, the number of a plurality of chassis C constituting the bottom wall B is different from that in the first embodiment. Specifically, in the first embodiment, the bottom wall B includes three chassis C which are superimposed vertically while in the second embodiment, the bottom wall B includes four chassis C which are superimposed vertically. Hereinafter, descriptions will be made focusing on a portion different from that of the first embodiment. FIG. 8C is an exploded perspective view corresponding to FIG. 8B. As in FIG. 8C, the storage apparatus 1 of the second embodiment includes a fourth chassis C4 superimposed on the upper side of the third chassis C3, in addition to the first to third vertically overlapping chassis C1 to C3.

As in FIG. 8C, the first chassis C1 includes a body portion 10, storing portions 11, fixing portions 12, and a terminal block 13 as described above. In particular, the first chassis C1 includes three storing portions 11 arranged at equal intervals in the horizontal direction. An interval I between the storing portions 11 of the first chassis C1 is larger than three times the length of the horizontal width W of each storing portion 11 (I>W×3). Accordingly, in the interval between the storing portions 11 of the first chassis C1, three storing portions 11 of the other chassis C may be arranged side by side.

As in FIG. 8C, each of the second to fourth chassis C2 to C4 includes a body portion 10, storing portions 11, and fixing portions 12 as described above. In particular, each of the second to fourth chassis C2 to C4 includes three storing portions 11 arranged at equal intervals in the horizontal direction. Like the interval between the storing portions 11 of the first chassis C1, an interval between the storing portions 11 of each of the second to fourth chassis C2 to C4 is larger than three times the length of the horizontal width of each storing portion 11. Accordingly, in the interval between the storing portions 11 of each of the second to fourth chassis C2 to C4, three storing portions 11 of other chassis C may be arranged side by side.

Here, the structure of the storing portion 11 of each chassis C will be described. As in FIG. 8C, the storing portion 11 of each chassis C includes a pair of storing structure portions 110 provided on the top surface of the body portion 10. The pair of storing structure portions 110 have a pair of clamping surfaces 111 formed to clamp a pair of main surfaces of the HDD unit 2. Specifically, the pair of storing structure portions 110 have a pair of flat plate shapes perpendicular to a horizontal direction, and store the HDD unit 2 while the pair of main surfaces of the HDD unit 2 are clamped between the facing surfaces of the pair of flat plate shapes. Accordingly, the HDD unit 2 is supported in a vertical posture relative to the body portion 10.

As in FIG. 8C, the body portion 10 of each of the second to fourth chassis C2 to C4 includes a plurality of openings 10A which are arranged alternately with a plurality of storing portions 11. The openings 10A of the second and third chassis C2 and C3 are formed in the same manner as the openings 10A in FIGS. 3B and 3C as described above. The openings 10A of the fourth chassis C4 are formed to allow the storing portions 11 of the first to third chassis C1 to C3 to be exposed upward. Specifically, the leftmost opening 10A of the fourth chassis C4 in FIG. 8C is formed to allow the leftmost storing portion 11 of each of the first to third chassis C1 to C3 in FIG. 8C to be exposed upward. Similarly, the second left opening 10A of the fourth chassis C4 in FIG. 8C is formed to allow the second left storing portion 11 of each of the first to third chassis C1 to C3 in FIG. 8C to be exposed upward. Similarly, the third left opening 10A of the fourth chassis C4 in FIG. 8C is formed to allow the third left storing portion 11 of each of the first to third chassis C1 to C3 in FIG. 8C to be exposed upward.

As described above, in the storage apparatus 1 of the second embodiment, each of chassis C other than the lowermost chassis C1 includes openings 10A that allow storing portions 11 of chassis C other than the uppermost chassis C4 to be exposed upward. Accordingly, even after the plurality of chassis C1 to C4 are vertically superimposed, all the plurality of storing portions 11 of the plurality of chassis C1 to C4 are exposed upward. Specifically, in FIG. 8B, all the twelve storing portions 11 of the four chassis C1 to C4 are exposed upward. This may enable twelve HDD units 2 to be stored side by side in the horizontal direction, as in FIG. 8A.

Reference will be made to FIG. 8A again. In the storage apparatus 1 of the second embodiment, adjacent HDD units 2 are stored in separate chassis C. For example, the first left HDD unit 2(1) in FIG. 8A is stored in the first chassis C1, and the second left HDD unit 2(2) is stored in the second chassis C2. The third left HDD unit 2(3) in FIG. 8A is stored in the third chassis C3, and the fourth left HDD unit 2(4) is stored in the fourth chassis C4. Similarly, the fifth left to eighth left HDD units 2(5) to 2(8) in FIG. 8A are stored in the first to fourth chassis C1 to C4, respectively. Similarly, the ninth left to twelfth left HDD units 2(9) to 2(12) in FIG. 8A are stored in the first to fourth chassis C1 to C4, respectively.

Figure 9:
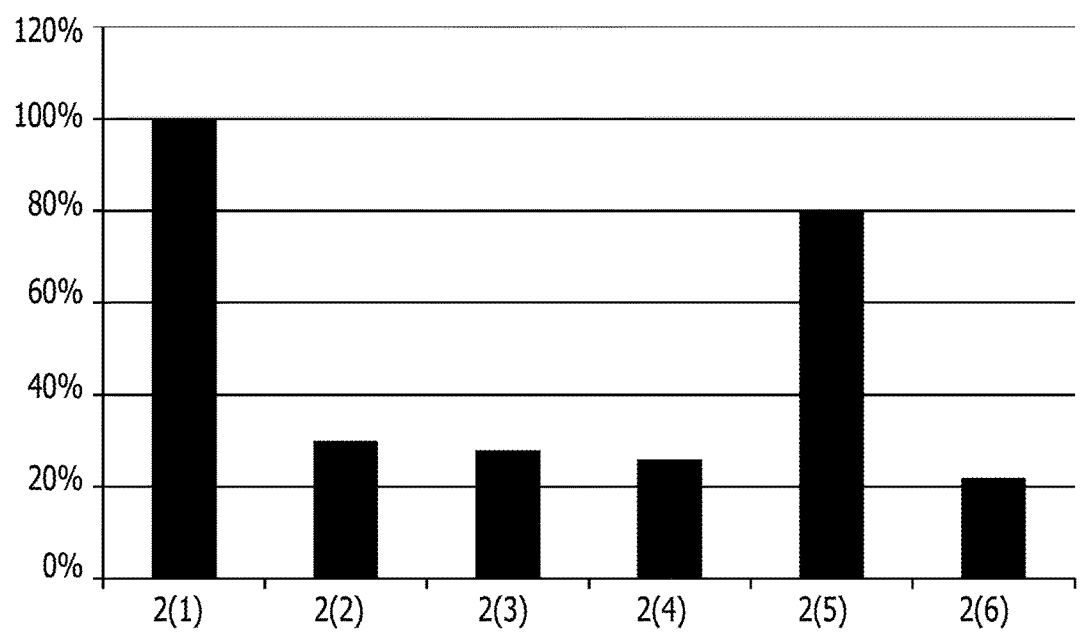
FIG. 9 is a bar graph representing a reduction effect of a vibration transmission rate which is achieved by the storage apparatus of the second embodiment.

Accordingly, according to the second embodiment, since the vibrations of adjacent HDD units 2 are transferred to separate chassis C, a vibration transmission rate from one of the adjacent HDD units 2 to the other of the adjacent HDD units 2 may be reduced. Hereinafter, descriptions will be made on a reduction effect of a vibration transmission rate which is achieved by the storage apparatus 1 of second embodiment. Table 3 below illustrates a rate of a vibration transferred to the other HDD units 2(2) to 2(6) when the vibration is generated during the operation of only the first left HDD unit 2(1) in FIG. 8A. The vibration transmission rate in Table 3 is calculated from, for example, a vibration measurement value (Grms value) of a first acceleration sensor attached to the first HDD unit 2(1), and a vibration measurement value (Grms value) of a second acceleration sensor attached to each of the other HDD units 2(2) to 2(6). FIG. 9 is a bar graph representing a vibration transmission rate in Table 3.

TABLE 3

| HDD unit | (1) | (2) | (3) | (4) | (5) | (6) |
|---|---|---|---|---|---|---|
| Vibration transmission rate | 100% | 30% | 28% | 26% | 80% | 22% |

As can be seen from FIG. 9, in the storage apparatus 1 of the second embodiment, the vibration transmission rate between the adjacent HDD units 2 is largely reduced. Specifically, in the storage apparatus 1 of the second embodiment, merely 30.0% of the vibration of the first left HDD unit 2(1) is transferred to its adjacent HDD unit 2(2). The reason why the vibration transmission rate is reduced as described above is because the first left HDD unit 2(1) and the second left HDD unit 2(2) are stored in separate chassis C, respectively. As described above, the first left HDD unit 2(1) is stored in the first chassis C1, and the second left HDD unit 2(2) is stored in the second chassis C2

Similarly, in the storage apparatus 1 of the second embodiment, merely 28% of the vibration of the first left HDD unit 2(1) is transferred to the third left HDD unit 2(3). The reason why the vibration transmission rate is reduced as described above is because the first left HDD unit 2(1) and the third left HDD unit 2(3) are stored in separate chassis C, respectively. As described above, the first left HDD unit 2(1) is stored in the first chassis C1, and the third left HDD unit 2(3) is stored in the third chassis C3. Similarly, in the storage apparatus 1 of the second embodiment, merely 26% of the vibration of the first left HDD unit 2(1) is transferred to the fourth left HDD unit 2(4). The reason why the vibration transmission rate is reduced as described above is because the first left HDD unit 2(1) and the fourth left HDD unit 2(4) are stored in separate chassis C, respectively. As described above, the first left HDD unit 2(1) is stored in the first chassis C1, and the fourth left HDD unit 2(4) is stored in the fourth chassis C4.

Figure 10A:
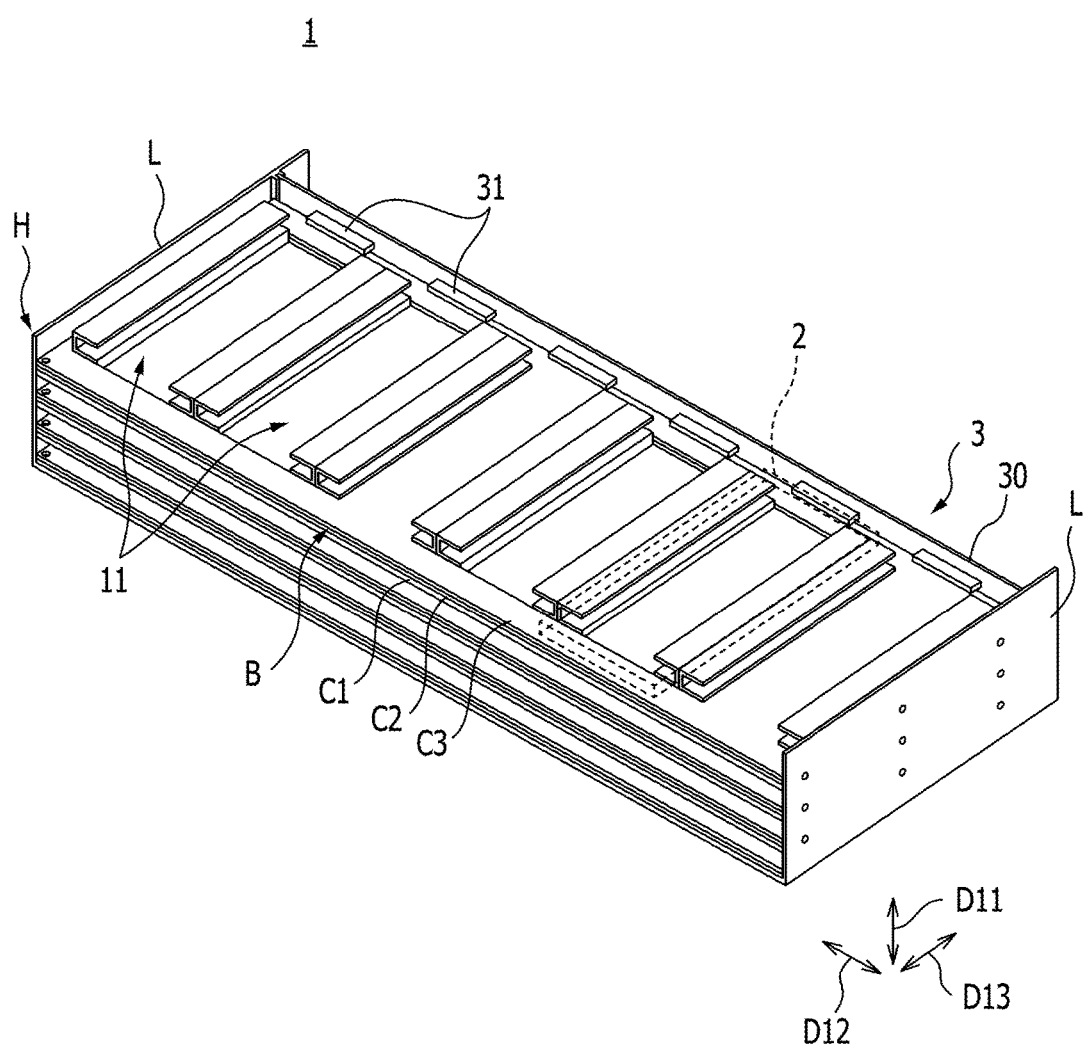
FIG. 10A is a perspective view of a storage apparatus of a third embodiment.

Hereinafter, descriptions will be made on the storage apparatus 1 of a third embodiment of the present application with reference to FIGS. 10A to 10C and FIGS. 11A to 11C. FIG. 10A is a perspective view illustrating the storage apparatus 1 of the third embodiment. As in FIG. 10A, the storage apparatus 1 of the third embodiment includes a chassis assembly H configured to store a plurality of HDD units 2, and a connector board 3 provided within the chassis assembly H to face the plurality of HDD units 2. Similarly to the first embodiment, the chassis assembly H includes a bottom wall B, a pair of side walls L, and a top wall T (omitted in FIG. 10A). The connector board 3 includes a substrate 30 provided to be perpendicular to both the bottom wall B and the side wall L, and a plurality of connectors 31 mounted on the substrate 30. Meanwhile, the storage apparatus 1 of the third embodiment may include the connector board 3' illustrated in FIGS. 6 and 7.

Figure 10B:
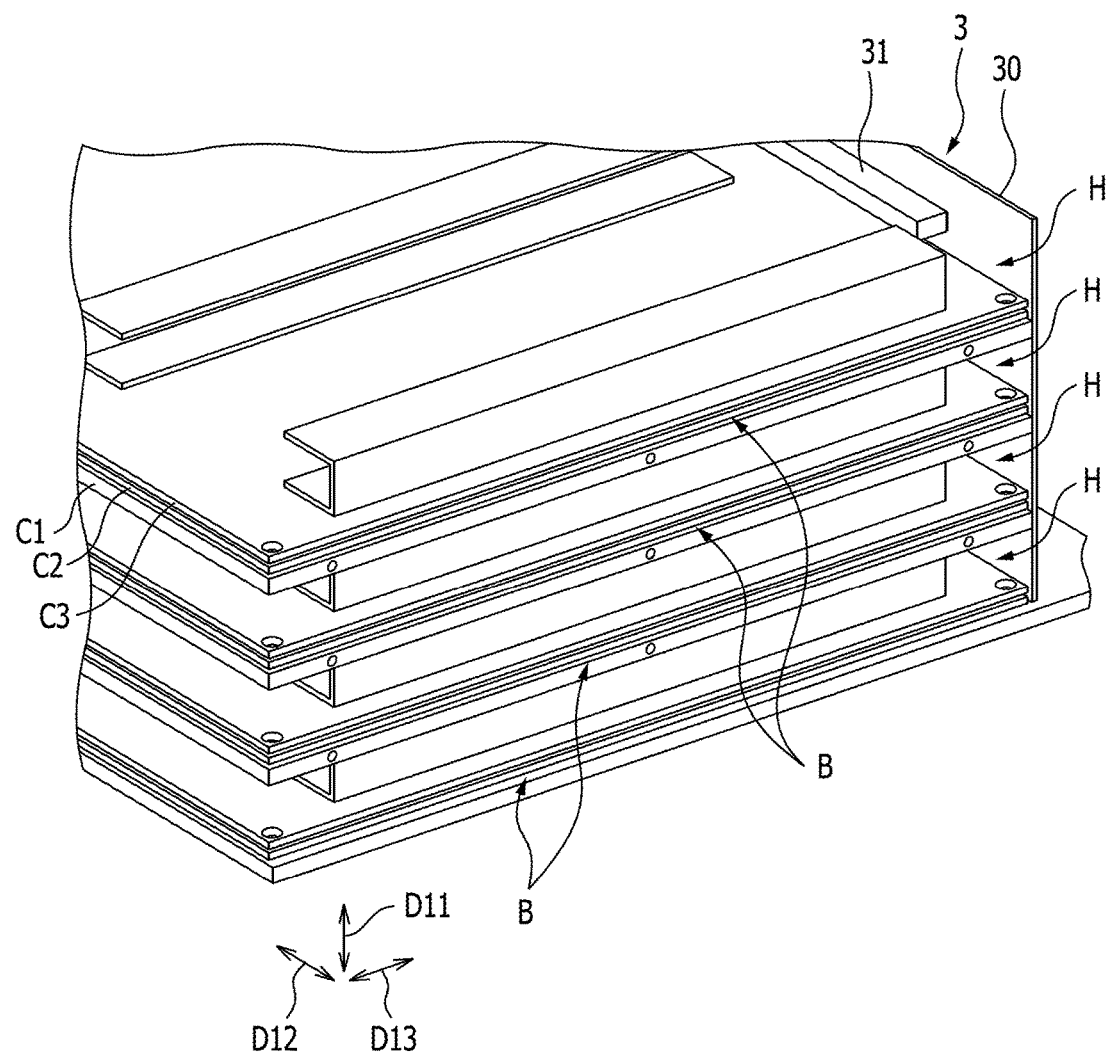
FIG. 10B is a partial enlarged view illustrating one edge portion of a bottom wall in FIG. 10A in the horizontal direction.

As can be found from comparison of FIG. 10A to FIG. 2C, in the storage apparatus 1 of the third embodiment, the posture of the HDD unit 2 relative to each chassis C is different from that in the first embodiment as described above. Specifically, in the first embodiment, each HDD unit 2 is supported in a vertical posture relative to each chassis C while in the third embodiment, each HDD unit 2 is supported in a horizontal posture relative to each chassis C. Also, in the storage apparatus 1 of the third embodiment, the number of storing portions 11 provided in each chassis C is different from that of the first embodiment. Specifically, in the first embodiment, three storing portions 11 are provided in each chassis C while in the third embodiment, two storing portions 11 are provided in each chassis C. This will be described in detail with reference to FIGS. 11A to 11C. FIG. 10B is a partial enlarged view illustrating the storage apparatus 1 in FIG. 10A, and illustrates one edge portion of a bottom wall B in FIG. 10A in the horizontal direction. For convenience, one side wall L is omitted in FIG. 10B.

As in FIG. 10B, the storage apparatus 1 of the third embodiment includes a plurality of chassis assemblies H which are disposed to overlap each other in the vertical direction, and each of the chassis assemblies H includes a plurality of chassis C1 to C3 which are disposed to overlap each other in the vertical direction. In particular, the storage apparatus 1 includes four chassis assemblies H, and the four chassis assemblies H have a common structure. Hereinafter, the structure of the uppermost chassis assembly H will be described. Also, four rows of connectors 31, which correspond to the four chassis assemblies H, respectively, are mounted on the substrate 30 of the connector board 3. As in FIGS. 10A and 10B, the bottom wall B of each chassis assembly H includes first to third chassis C1 to C3 which are disposed to overlap each other in the vertical direction.

Figure 10C:
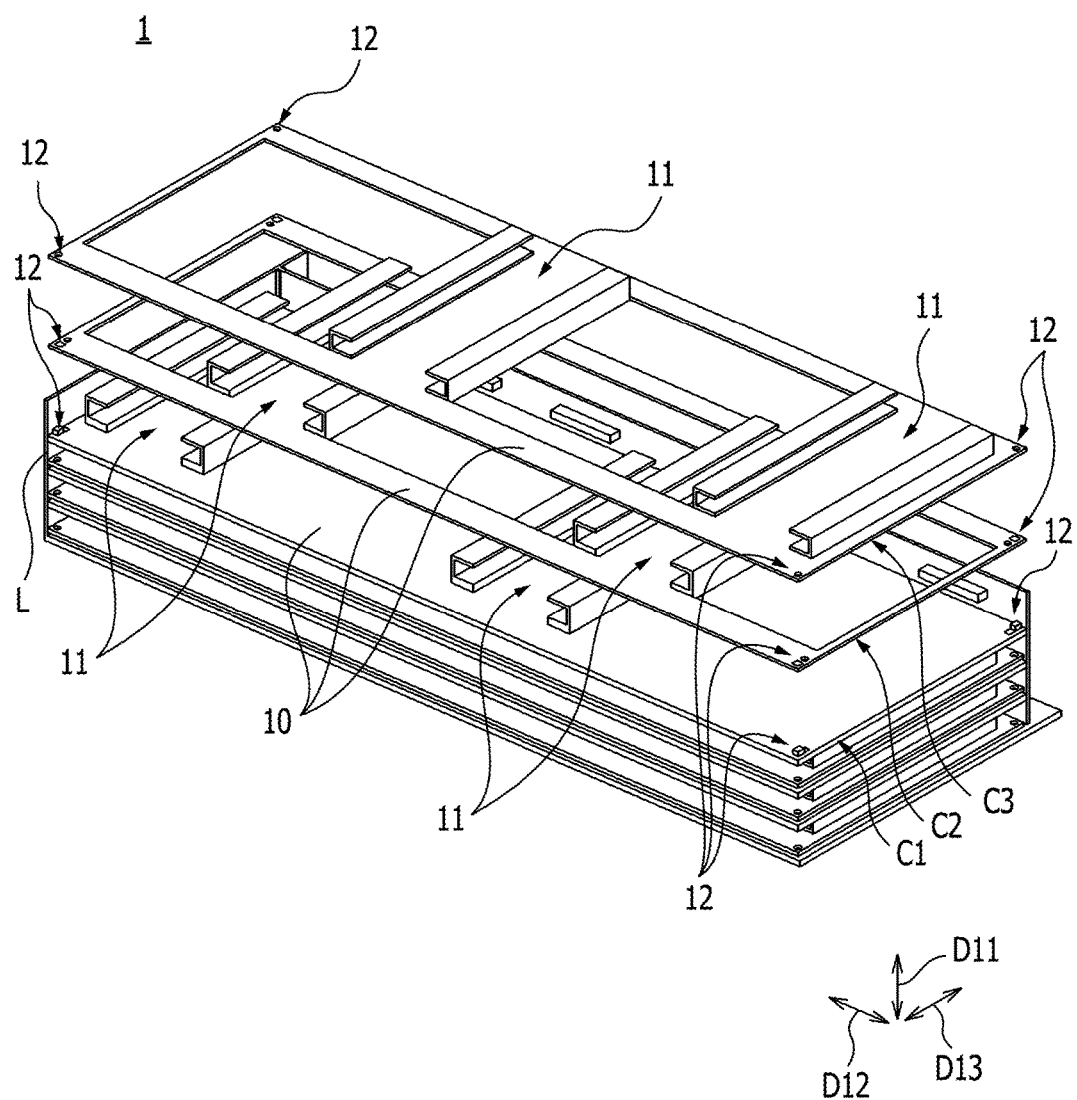
FIG. 10C is an exploded perspective view corresponding to FIG. 10A.
Figure 11A:
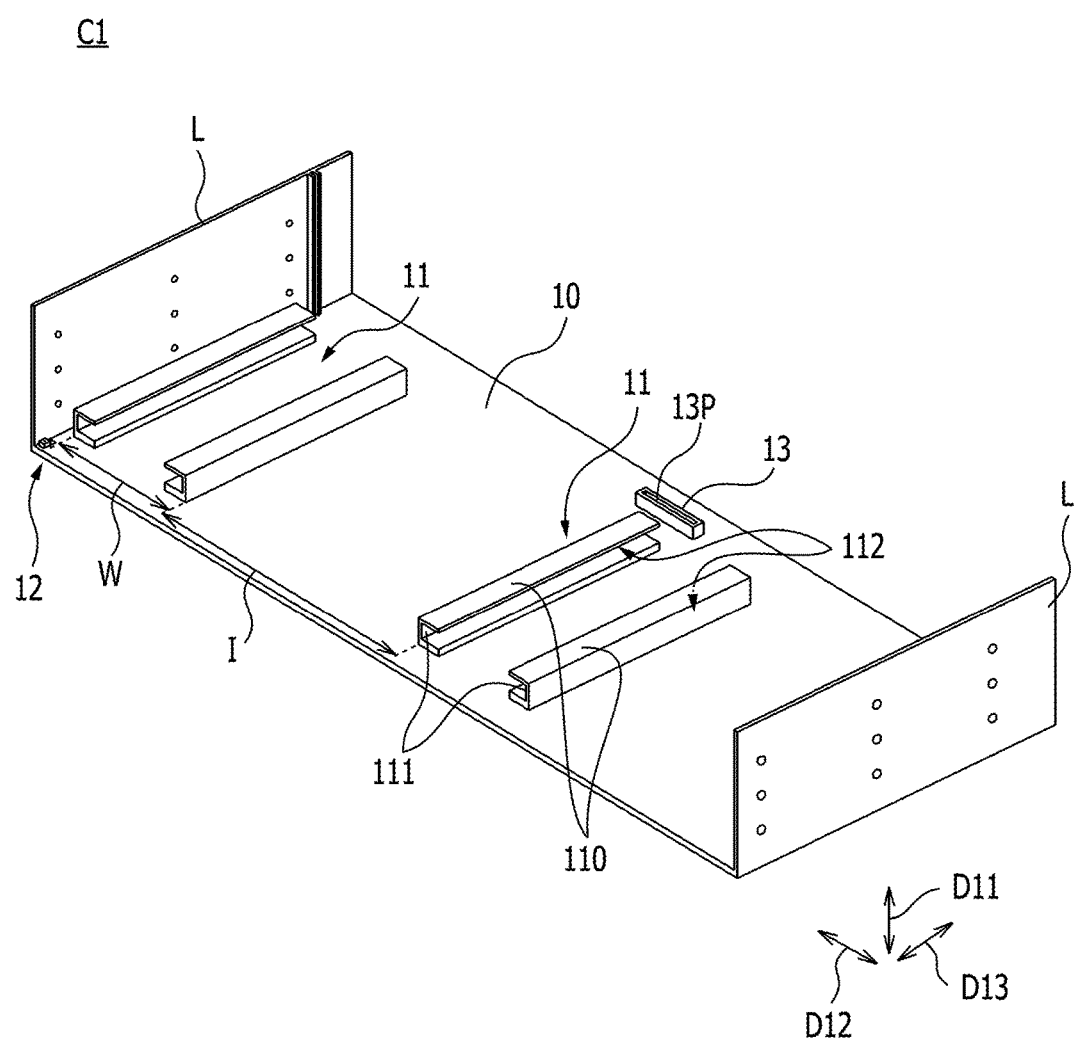
FIG. 11A is a perspective view illustrating a first chassis in the storage apparatus of the third embodiment.

FIG. 10C is an exploded perspective view corresponding to FIG. 10A. As in FIG. 10C, each chassis C includes a body portion 10 having a flat plate shape, a plurality of storing portions 11 configured to store the HDD units 2 on the upper sides thereof, and a plurality of fixing portions 12 configured to fix the body portion 10 to another chassis C. In particular, each chassis C includes two storing portions 11 arranged to be spaced apart from each other in the horizontal direction. For example, each chassis assembly H includes six storing portions 11 in total. Each storing portion 11 is formed to support the HDD unit 2 in a horizontal posture relative to the body portion 10. A more detailed structure of each storing portion 11 will be described with reference to FIGS. 11A to 11C. Here, the structure of the fixing portion 12 of each chassis C is substantially the same as that of the first embodiment described above. FIG. 11A is a perspective view illustrating the first chassis C1 in the storage apparatus 1 of the third embodiment. As in FIG. 11A, the above-described side walls L are fixed to the edge portions of the body portion 10 in the horizontal direction.

As described above, the storing portions 11 of the first chassis C1 are arranged at certain intervals in the horizontal direction. An interval I between the storing portions 11 of the first chassis C1 is larger than twice the length of the horizontal width W of each storing portion 11 (I>W×2). Accordingly, in the interval between the storing portions 11 of the first chassis C1, two storing portions 11 of other chassis C may be arranged side by side. Specifically, in the interval I between the storing portions 11 of the first chassis C1, one storing portion 11 of the second chassis C2 and one storing portion 11 of the third chassis C3 may be arranged side by side.

Herein, the structure of the storing portion 11 of the first chassis C1 will be described. As in FIG. 11A, the storing portion 11 of the first chassis C1 includes a pair of storing structure portions 110 provided on the top surface of the body portion 10. The pair of storing structure portions 110 have a pair of clamping surfaces 111 formed to clamp a pair of side surfaces of the HDD unit 2. Specifically, the pair of storing structure portions 110 have a pair of prismatic shapes extending along a longitudinal direction, and a pair of retaining grooves 112 capable of retaining the side edges of the HDD unit 2 are provided on the facing surfaces of the pair of prismatic shapes. For example, the pair of clamping surfaces 111 described above are formed by the bottom surfaces of the pair of retaining grooves 112. Accordingly, the HDD unit 2 is supported in a horizontal posture relative to the body portion 10. The storing portions 11 of the second and third chassis C2 and C3 have substantially the same structure as that of the storing portion 11 of the first chassis C1 as described above.

Figure 11B:
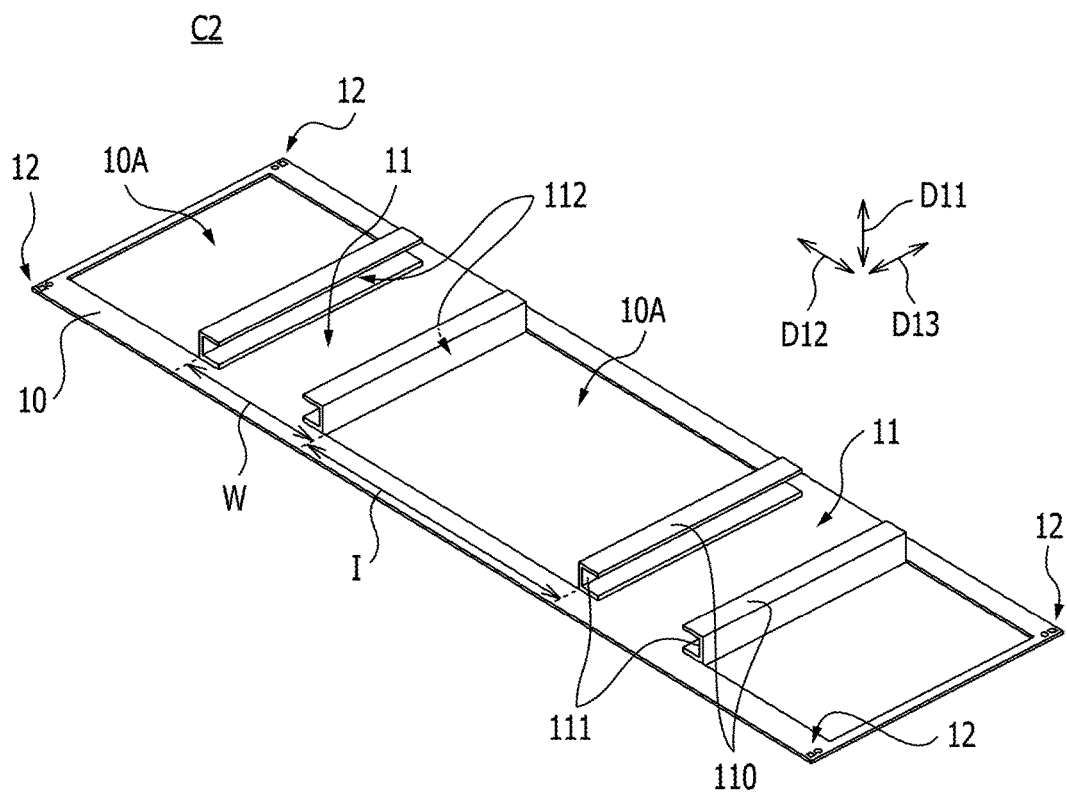
FIG. 11B is a perspective view illustrating a second chassis in the storage apparatus of the third embodiment.

FIG. 11B is a perspective view illustrating the second chassis C2 in the storage apparatus 1 of the third embodiment. As described above, the storing portions 11 of the second chassis C2 are arranged at certain intervals in the horizontal direction. An interval I between the storing portions 11 of the second chassis C2 is larger than twice the length of the horizontal width W of each storing portion 11 (I>W×2). Accordingly, in the interval I between the storing portions 11 of the second chassis C2, two storing portions 11 of other chassis C may be arranged side by side.

As in FIG. 11B, the second chassis C2 includes a plurality of rectangular openings 10A provided on the body portion 10, in addition to the body portion 10, the storing portions 11, and the fixing portions 12 as described above. The plurality of openings 10A of the second chassis C2 are arranged alternately with the plurality of storing portions 11 in the horizontal direction. In particular, even after the second chassis C2 is superimposed on the first chassis C1, the plurality of openings 10A of the second chassis C2 are formed to allow the plurality of storing portions 11 of the first chassis C1 to be exposed upward (see, FIGS. 10A and 10C). Specifically, the left opening 10A of the second chassis C2 in FIG. 11B is formed to allow the left storing portion 11 of the first chassis C1 in FIG. 11A to be exposed upward. Similarly, the right opening 10A of the second chassis C2 in FIG. 11B is formed to allow the right storing portion 11 of the first chassis C1 in FIG. 11A to be exposed upward.

Figure 11C:
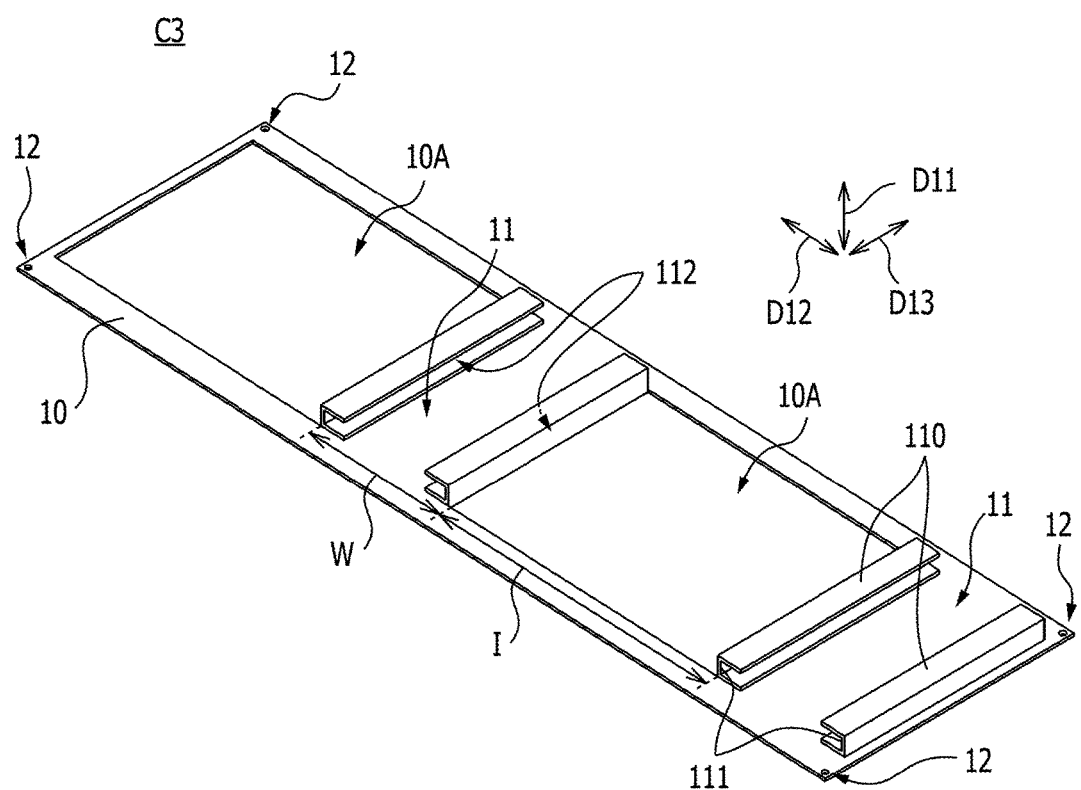
FIG. 11C is a perspective view illustrating a third chassis in the storage apparatus of the third embodiment.

FIG. 11C is a perspective view illustrating the third chassis C3 in the storage apparatus 1 of the third embodiment. As described above, the storing portions 11 of the third chassis C3 are arranged at certain intervals in the horizontal direction. An interval I between the storing portions 11 of the third chassis C3 is larger than twice the length of the horizontal width W of each storing portion 11 (I>W×2). Accordingly, in the interval I between the storing portions 11 of the third chassis C3, two storing portions 11 of other chassis C may be arranged side by side.

As in FIG. 11C, the third chassis C3 includes a plurality of rectangular openings 10A provided on the body portion 10, in addition to the body portion 10, the storing portions 11, and the fixing portions 12 as described above. The plurality of openings 10A of the third chassis C3 are arranged alternately with the plurality of storing portions 11 in the horizontal direction. In particular, the plurality of openings 10A of the third chassis C3 are formed to allow the plurality of storing portions 11 of the first and second chassis C1 and C2 to be exposed upward even after the third chassis C3 is superimposed on the first and second chassis C1 and C2. Specifically, the left opening 10A of the third chassis C3 in FIG. 11C is formed to allow both the left storing portion 11 of the first chassis C1 in FIG. 11A and the left storing portion 11 of the second chassis C2 in FIG. 11B to be exposed upward. Similarly, the right opening 10A of the third chassis C3 in FIG. 11C is formed to allow both the right storing portion 11 of the first chassis C1 in FIG. 11A and the right storing portion 11 of the second chassis C2 in FIG. 11B to be exposed upward.

As described above, in the storage apparatus 1 of the third embodiment, each of chassis C other than the lowermost chassis C1 includes openings 10A that allow storing portions 11 of chassis C other than the uppermost chassis C3 to be exposed upward. Accordingly, even after the plurality of chassis C are vertically superimposed, all the plurality of storing portions 11 of the plurality of chassis C1 to C3 are exposed upward. Specifically, in FIG. 10A, all the six storing portions 11 of the three chassis C1 to C3 are exposed upward. This may enable six HDD units 2 to be stored side by side in the horizontal direction. In particular, in the storage apparatus 1 of the third embodiment, adjacent HDD units 2 are stored in separate chassis C, respectively. Accordingly, according to the present embodiment, since vibrations of adjacent HDD units 2 are transferred to separate chassis C, a vibration transmission rate from one of the adjacent HDD units 2 to the other of the adjacent HDD units 2 may be reduced.

The present application has been described in detail, particularly, with reference to several embodiments thereof. For easy understanding of the present application, specific embodiments of the present application are noted below.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A storage apparatus of an electronic device, the storage apparatus comprising:
a plurality of chassis each configured to store a plurality of electronic devices at a top surface of the respective chassis, at an interval in which at least one electronic device is capable of being disposed; and
a fixing portion configured to fix the plurality of chassis, at least one of the plurality of chassis includes a chassis opening through which at least one of the electronic devices stored in another chassis among the plurality of chassis is disposed in the interval of electronic devices stored in the at least one of the plurality of chassis from a bottom surface of the at least one of the plurality of chassis.

2. The storage apparatus according to claim 1, wherein the plurality of chassis are disposed to overlap in a vertical direction, and wherein the storage apparatus further comprises:
a plurality of storing portions provided on the top surfaces of the plurality of chassis, respectively, to store the electronic devices and
the plurality of chassis excluding a lowermost chassis include a plurality of chassis openings including the chassis opening which allow the plurality of storing portions of each of the plurality of chassis, excluding an uppermost chassis, to be exposed upward.

3. The storage apparatus according to claim 1, wherein the storage apparatus includes a plurality of storing portions provided on the top surfaces of the plurality of chassis, respectively, to store the electronic devices,
wherein the plurality of chassis include a first chassis located at a lowermost layer, a second chassis located at an upper layer of the first chassis, and a third chassis located at an upper layer of the second chassis, and one of the plurality of storing portions of the second chassis is disposed between one of the plurality of storing portions of the first chassis and one of the plurality of storing portions of the third chassis.

4. The storage apparatus according to claim 3, wherein the plurality of chassis further include a fourth chassis located at an upper layer of the third chassis, and one of the plurality of storing portions of the third chassis is disposed between one of the plurality of storing portions of the second chassis and one of the plurality of storing portions of the fourth chassis.

5. The storage apparatus according to claim 1, wherein each of the plurality of electronic devices has an outer shape of a rectangular parallelepiped, and a plurality of storing portions, provided on the top surfaces of each of the plurality of chassis and storing the electronic devices, includes a pair of clamping surfaces formed to clamp a pair of parallel surfaces of the rectangular parallelepiped.

6. The storage apparatus according to claim 5, wherein the pair of clamping surfaces are formed to clamp a pair of main surfaces of the rectangular parallelepiped.

7. The storage apparatus according to claim 5, wherein the pair of clamping surfaces are formed to clamp a pair of side surfaces of the rectangular parallelepiped.

8. The storage apparatus according to claim 1, wherein the fixing portion fixes the plurality of chassis such that the plurality of chassis are disposed to be spaced apart from each other in a vertical direction.

9. The storage apparatus according to claim 1, further comprising:
a plurality of connectors connected to the respective electronic devices, wherein the plurality of connectors connected to the respective electronic devices, which are adjacent to each other, are mounted on separate substrates, respectively.

10. The storage apparatus according to claim 9, wherein the plurality of connectors connected to the respective electronic devices stored in the same chassis among the plurality of chassis are mounted on a common substrate.

11. The storage apparatus according to claim 9, wherein the connectors are mounted on respective front surfaces of a plurality of substrates which are arranged to overlap in a longitudinal direction, and wherein the storage apparatus further comprises: a plurality of substrate openings provided in each of the plurality of substrates, excluding a rearmost substrate, such that the connectors mounted on each of the plurality of substrates, excluding a frontmost substrate, is exposed forward.

12. A storage apparatus of an electronic device, the storage apparatus comprising:
   a first chassis including at least one first storing portion provided on a top surface of the first chassis to store a first electronic device;
   a second chassis including at least one second storing portion provided on a top surface of the second chassis to store a second electronic device and at least one first opening to allow the first storing portion to pass through from the side of a rear surface of the second chassis to the side of the top surface of the second chassis; and
   a third chassis including at least one third storing portion provided on a top surface of the third chassis to store a third electronic device and at least one second opening to allow the second storing portion to pass through from the side of the second chassis from the side of a rear surface of the third chassis to the side of the top surface of the third chassis.

13. The storage apparatus according to claim 12, wherein the first chassis, the second chassis and the third chassis are stacked in the order.

14. A storage apparatus of an electronic device, the storage apparatus comprising: a plurality of chassis each configured to store a plurality of electronic devices, at an interval in which at least one electronic device is capable of being disposed; and a fixing portion configured to fix the plurality of chassis, wherein at least one of the plurality of chassis is formed such that in the interval of the electronic devices stored in the at least one of the plurality of chassis, at least one of the electronic devices stored in another chassis among the plurality of chassis is disposed; the fixing portion fixes the plurality of chassis such that the plurality of chassis are disposed to be spaced apart from each other in a vertical direction.

15. The storage apparatus according to claim 14, wherein the plurality of chassis are disposed to overlap in a vertical direction, and wherein the storage apparatus further comprises:
   a plurality of storing portions provided on top surfaces of the plurality of chassis, respectively, to store the electronic devices; and
   a plurality of chassis openings provided in each of the plurality of chassis, excluding a lowermost chassis, to allow the plurality of storing portions of each of the plurality of chassis, excluding an uppermost chassis, to be exposed upward.

16. The storage apparatus according to claim 14, wherein the storage apparatus includes a plurality of storing portions provided on top surfaces of the plurality of chassis, respectively, to store the electronic devices, wherein the plurality of chassis include a first chassis located at a lowermost layer, a second chassis located at an upper layer of the first chassis, and a third chassis located at an upper layer of the second chassis, and one of the plurality of storing portions of the second chassis is disposed between one of the plurality of storing portions of the first chassis and one of the plurality of storing portions of the third chassis.

17. The storage apparatus according to claim 14, wherein each of the plurality of electronic devices has an outer shape of a rectangular parallelepiped, and a plurality of storing portions, provided on top surfaces of each of the plurality of chassis and storing the electronic devices, includes a pair of clamping surfaces formed to clamp a pair of parallel surfaces of the rectangular parallelepiped.

18. The storage apparatus according to claim 14, further comprising a plurality of connectors connected to the respective electronic devices, wherein the plurality of connectors connected to the respective electronic devices, which are adjacent to each other, are mounted on separate substrates, respectively.

* * * * *